(12) United States Patent
de Quehen et al.

(10) Patent No.: US 10,812,265 B1
(45) Date of Patent: *Oct. 20, 2020

(54) USING CRYPTOGRAPHIC CO-PROCESSORS IN A SUPERSINGULAR ISOGENY-BASED CRYPTOSYSTEM

(71) Applicant: ISARA Corporation, Waterloo (CA)

(72) Inventors: Victoria de Quehen, Waterloo (CA); Shane Daniel Kelly, Waterloo (CA)

(73) Assignee: Isara Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,733

(22) Filed: Apr. 30, 2020

(51) Int. Cl.
*H04L 9/30* (2006.01)

(52) U.S. Cl.
CPC .......... *H04L 9/3066* (2013.01); *H04L 9/3013* (2013.01)

(58) Field of Classification Search
None
See application file for complete search history.

(56) References Cited

U.S. PATENT DOCUMENTS

| | | | |
|---|---|---|---|
| 7,594,261 B2 * | 9/2009 | Lauter | H04L 9/3073 380/28 |
| 10,116,443 B1 | 10/2018 | Kalach et al. | |
| 10,218,494 B1 | 2/2019 | De Quehen et al. | |
| 10,218,504 B1 | 2/2019 | Kalach et al. | |
| 10,630,476 B1 | 4/2020 | De Quehen et al. | |
| 2009/0074178 A1 * | 3/2009 | Longa | G06F 7/725 380/28 |
| 2010/0082992 A1 * | 4/2010 | Broker | H04L 9/3247 713/176 |
| 2015/0256542 A1 * | 9/2015 | Alasingara Bhattachar | H04L 63/0884 713/182 |
| 2018/0323973 A1 | 11/2018 | Soukharev | |

OTHER PUBLICATIONS

Costello et al Efficient algorithms for supersingular isogeny Diffie-Hellman, AdvancesInCryptologyASIACRYPT2016, 34 pages (Year: 2016).*

Cervantes-Vazquez , et al., "Parallel strategies for SIDH: Towards computing SIDH twice as fast", https://eprint.iacr.org/2020/383, Apr. 2, 2020, 31 pgs.

(Continued)

*Primary Examiner* — Fatoumata Traore
(74) *Attorney, Agent, or Firm* — Henry Patent Law Firm PLLC

(57) ABSTRACT

In a general aspect, a supersingular isogeny-based cryptography process is performed. In some aspects, a cryptographic element is generated by executing a supersingular isogeny-based cryptography protocol. A generator of a first isogeny kernel is computed. A pre-determined tree topology is traversed. The tree topology includes nodes coupled by edges. The edges of the pre-determined tree topology include a first set of edges representing scalar multiplications and a second set of edges representing point evaluations. A plurality of isogeny kernels corresponding to respective nodes in the tree topology and having a lower order than the first isogeny kernel is computed by executing batches of operations using a plurality of cryptographic co-processors. At least one of the batches includes two or more of the scalar multiplications represented in the tree topology.

27 Claims, 8 Drawing Sheets

(56) References Cited

OTHER PUBLICATIONS

Costello, et al., "A simple and compact algorithm for SIDH with arbitrary degree isogenics", AdvancesInCryptologyASIACRYPT2, 2017, 22 pgs.

Costello, et al., "Efficient algorithms for supersingular isogeny Diffie-Hellman", AdvancesInCryptologyCRYPTO2016, 2016, 34 pgs.

De Feo, et al., "Towards quantum-resistant cryptosystems from supersingular elliptic curve isogenies", J. Math. Cryptol. 8 (2014), 209-247, 2014, 39 pgs.

Hutchinson, et al., "Constructing Canonical Strategies for Parallel Implementation of Isogeny Based Cryptography", ProgressInCryptologyINDOCRYPT2, 2018, 21 pgs.

Jao, et al., "Supersingular Isogeny Key Encapsulation", https://csrc.nist.gov/Projects/Post-quantum-Cryptography/Round-1-Submissions, Nov. 30, 2017, 75 pgs.

Koziel, et al., "Fast Hardware Architectures for Supersingular Isogeny Diffie-Hellman Key Exchange on FPGA", ProgressInCryptologyINDOCRYPT2, 2016, 17 pgs.

Velu, "Géométrie Algébrique—Isogénies entre courbes elliptiques", C. R. Acad. Sc. Paris, t. 273, Jul. 26, 1971, 8 pgs.

USPTO, Notice of Allowance dated Jun. 16, 2020, in U.S. Appl. No. 16/863,837, 15 pgs.

USPTO, Notice of Allowance dated Jun. 18, 2020, in U.S. Appl. No. 16/863,791, 26 pgs.

\* cited by examiner

USING CRYPTOGRAPHIC CO-PROCESSORS IN A SUPERSINGULAR ISOGENY-BASED CRYPTOSYSTEM

BACKGROUND

The following description relates to computing an isogeny kernel in supersingular isogeny-based cryptographic protocols.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1:
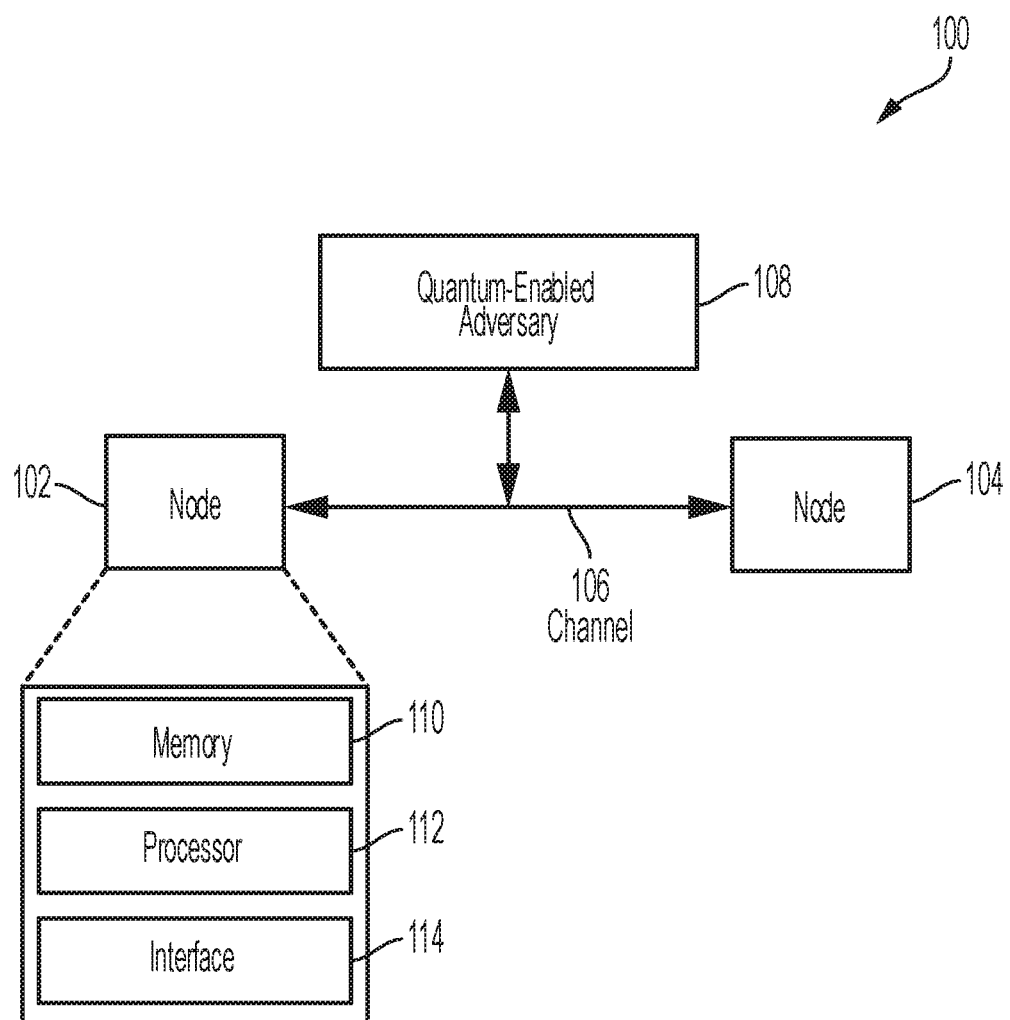
FIG. 1 is a block diagram showing aspects of an example communication system.

In some aspects of the present disclosure, technologies for implementing supersingular isogeny-based cryptography are described. In some cases, the systems and techniques described here may provide greater computational efficiency, greater resource utilization or other advantages and improvements, for example, in the execution of supersingular isogeny-based cryptography protocols. The supersingular isogeny Diffie-Hellman key agreement protocol (SIDH) is an example of a supersingular isogeny-based cryptographic protocol that is believed to be secure against attacks carried out by quantum computers. And the supersingular isogeny key exchange (SIKE) protocol, which is a key encapsulation based on SIDH, is a potential candidate for post-quantum standardization. Thus, the systems and techniques described here may provide advantages and improvements for quantum-safe cryptography systems, as well as other types of cryptography systems. (A description of SIDH can be found in the publication entitled "Towards quantum-resistant cryptosystems from supersingular elliptic curve isogenies," by De Feo, et al., dated 2014, Journal of Mathematical Cryptology 8 (3), pp. 209-247. A description of SIKE can be found in the publication entitled "Supersingular Isogeny Key Encapsulation (SIKE)" by David Jao, et al., dated Nov. 30, 2017, which is publicly available at https://sike.org/files/SIDH-spec.pdf.)

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more secure, more computationally efficient or providing other advantages in some instances.

In some cryptographic protocols (including the example protocol 200 shown in FIG. 2 and variants), an entity (e.g., "Bob") sets up a cryptosystem and generates its public key by computing a generator of an isogeny kernel having an order of $l^n$. Bob may then receive a public key from another entity (e.g., "Alice"), and prior to executing cryptographic correspondence, Bob can verify the received public key from Alice by computing the generator of an isogeny kernel according to certain public parameters of the cryptosystem. The generator of the isogeny kernel is computed according to an algorithm which contains sub-algorithms and can be described by a tree topology. Improved efficiency can be achieved by operating the dedicated cryptographic co-processors in batches (e.g., in parallel). Each of the batches represents a sub-algorithm, which includes cryptographic operations such as scalar multiplication, point evaluation and image curve evaluation. Each of the cryptographic operations in a batch can be performed by a dedicated cryptographic co-processor.

In some cases, the techniques described here organize the sub-algorithms into batches of cryptographic operations performed by multiple cryptographic co-processors. Improvements may be achieved, for example, by prioritizing cryptographic operations for determining generators of isogeny kernels into earlier batches over other types of operations; by scheduling point evaluations on a public parameter in batches in which cryptographic co-processors are not occupied; by introducing one or more separate cryptographic co-processors for performing image curve evaluations; by redesigning a tree topology containing one or more zigzag paths which allows simultaneous scalar multiplications in a batch; or by a combination of these and other techniques in a multi-thread software and system.

In some cases, the techniques for determining a generator of an isogeny kernel described here can be used to improve a supersingular isogeny Diffie-Hellman (SIDH) protocol, a supersingular isogeny key exchange (SIKE) protocol, or other types of supersingular isogeny-based cryptography protocols conducted in a supersingular isogeny-based cryptosystem. For example, the techniques described here may be applied to supersingular isogeny-based public key encryption schemes, such as, for example, the public key encryption scheme described by De Feo et al. (De Feo, et al., "Towards quantum-resistant cryptosystems from supersingular elliptic curve isogenies." Journal of Mathematical Cryptology 8 (3), pp. 209-247, 2014.). As another example, the techniques described here may be applied to supersingular isogeny-based key encapsulation mechanism (KEM) schemes.

FIG. 1 is a block diagram showing aspects of an example communication system 100. The example communication system 100 shown in FIG. 1 includes two nodes 102, 104. The nodes 102, 104 use a supersingular isogeny-based cryptosystem to communicate with each other over a channel 106. The nodes 102, 104 represent distinct entities in the cryptosystem.

In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, serverless cloud computing systems, mainframes, IoT devices, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

In the example shown in FIG. 1, the entities represented by the nodes 102, 104 may correspond to a computing device, a computer system, an IP address or other network address, or another type of computer-readable identifier or instance of a computer resource. Accordingly, the computations and other operations of each entity may be performed by one or more processors or other elements of the respective node 102, 104. Similarly, information sent to or received by an entity may be sent to or received by an element (e.g., one or more processors, memories, or interfaces) of the respective node 102, 104.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or both of FIG. 2.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIG. 2.

Figure 3:
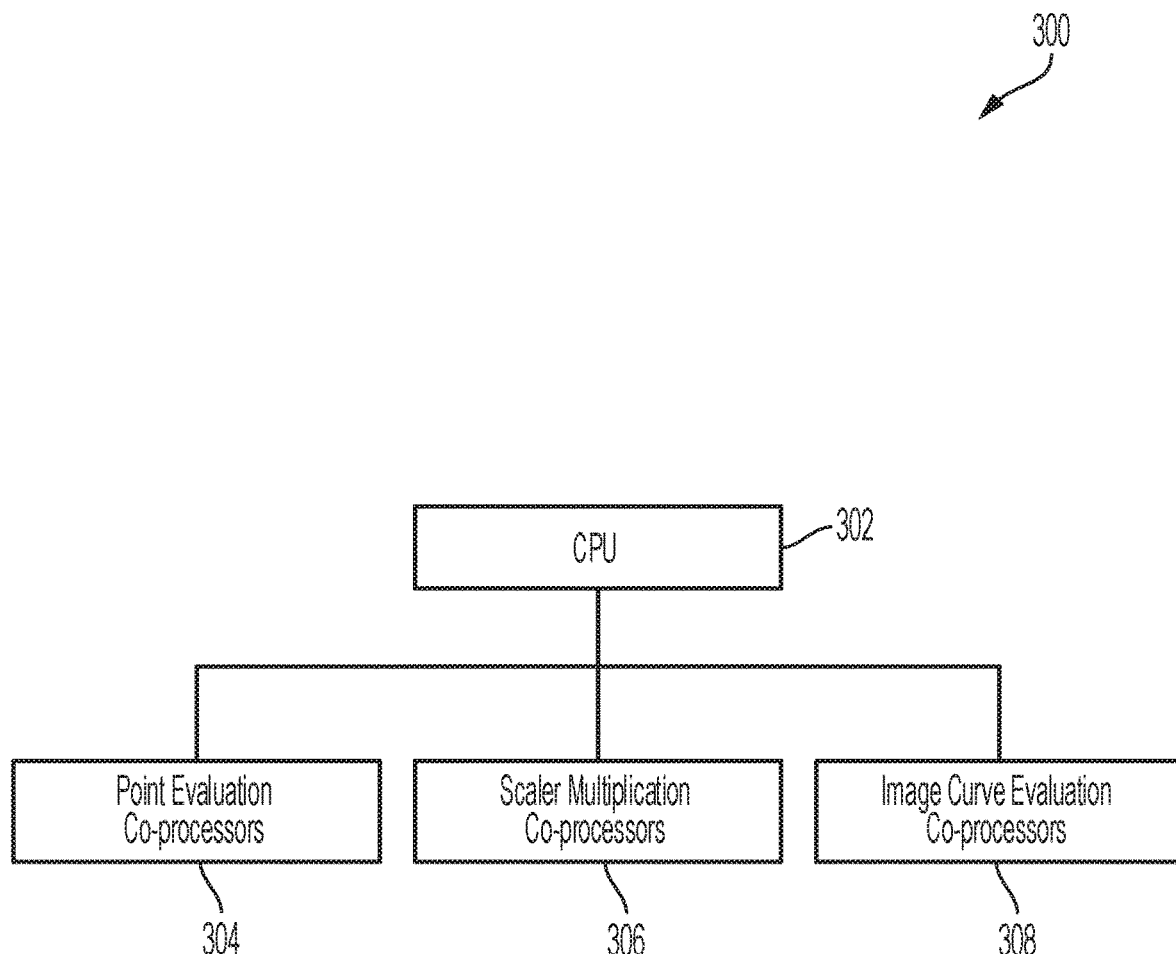
FIG. 3 is a block diagram showing example processors in an example computer system.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors (e.g., as shown in FIG. 3 or otherwise). For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using a wireless protocol or standard. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front-end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubit encodings. In some implementations, the quantum-enabled adversary 108 can operate in a fault-tolerant regime, or the quantum-enabled adversary may operate below the fault-tolerant regime.

Many public key cryptography systems ("cryptosystems") are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptography systems that are believed to be invulnerable to quantum attack. For example, supersingular isogeny-based protocols have been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally efficient manner. Accordingly, the example quantum-enabled adversary 108 can compromise the security of certain quantum-vulnerable cryptography systems (e.g., by computing a private key of a certificate authority or other entity based on public information).

The example quantum-enabled adversary 108 shown in FIG. 1 can access information exchanged between the nodes 102, 104 on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptography systems. For example, the quantum-enabled adversary 108 may be capable of computing prime factors fast enough to compromise certain RSA-based cryptography systems or computing discrete logarithms fast enough to compromise certain ECC-based cryptography systems.

In the example shown in FIG. 1, the nodes 102, 104 may use a quantum-resistant cryptography system that cannot be compromised by the example quantum-enabled adversary 108. For instance, the nodes 102, 104 may use a cryptography system that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol or a key encapsulation mechanism that is also secure against attacks by the quantum-enabled adversary 108. In some examples, the nodes 102, 104 can use the example techniques shown in FIG. 2, or the nodes 102, 104 may use variations of these and other techniques to communicate securely on the channel 106.

Figure 2:
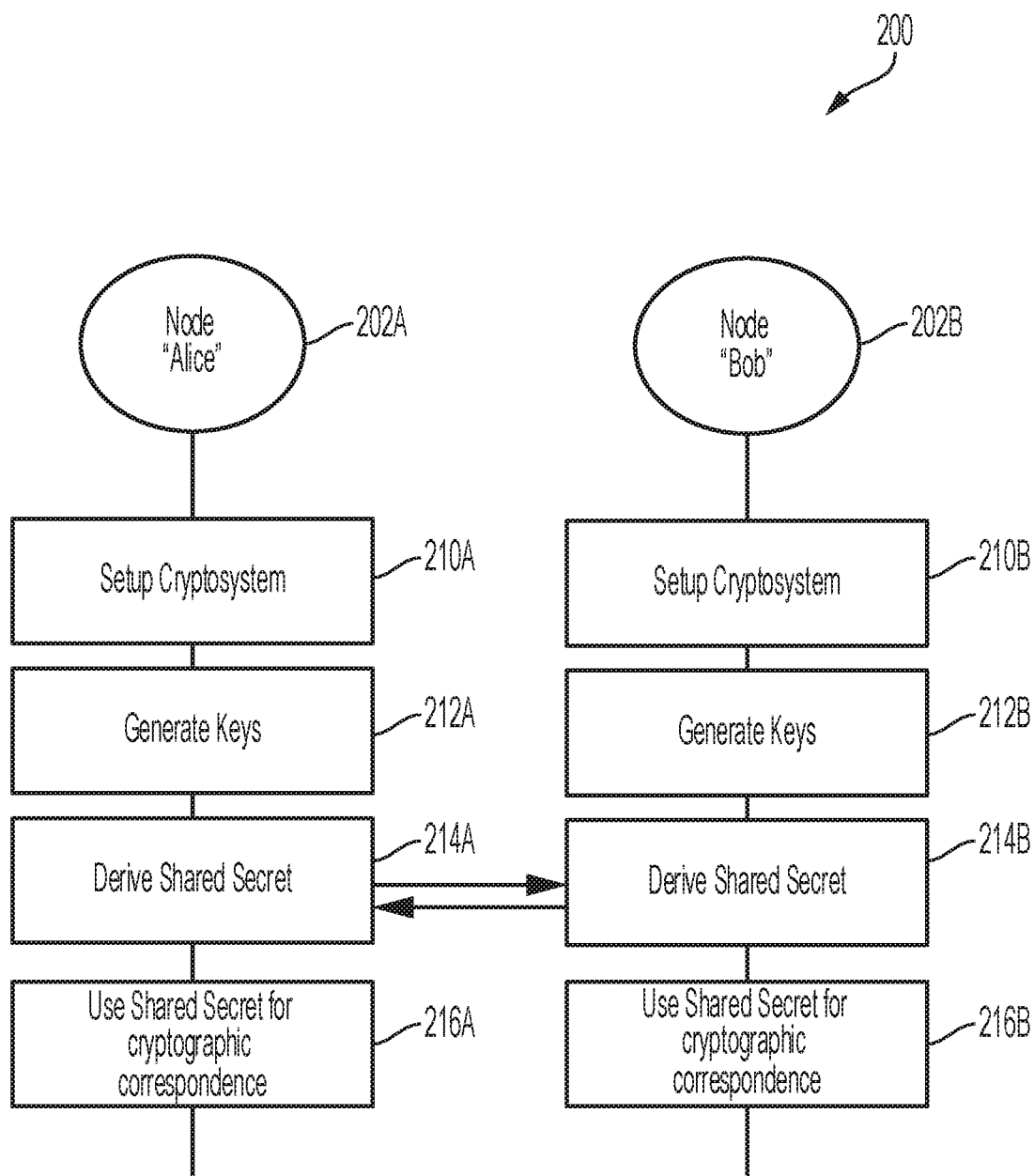
FIG. 2 is a flow diagram showing aspects of an example cryptosystem process.

FIG. 2 is a flow diagram showing aspects of an example cryptographic process 200. The example cryptographic process 200 can be performed, for example, by computer systems that can exchange information over a communication channel. For instance, operations in the cryptographic process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order.

In some cases, one or more of the operations shown in FIG. 2 are implemented as processes that include multiple operations, sub-processes or other types of routines. For example, the example operations shown in FIG. 2 can be used, in some instances, to perform a supersingular isogeny Diffie-Hellman (SIDH) protocol, a supersingular isogeny key exchange (SIKE) protocol, or any other types of supersingular isogeny-based cryptography protocols conducted in a supersingular isogeny-based cryptosystem. In some cases, operations can be combined, performed in parallel, iterated or otherwise repeated or performed in another manner.

The example process 200 shown in FIG. 2 includes operations performed by nodes 202A, 202B. In the example shown, the nodes 202A, 202B represent two distinct entities in a supersingular isogeny-based cryptosystem. The two distinct entities are referred to as "Alice" and "Bob" in FIG. 2. In the example shown, the nodes 202A, 202B exchange public data, and each node uses the public data provided by the other node to execute the process 200. In some cases, the nodes 202A, 202B may have a server-client relationship, a peer-to-peer relationship or another type of relationship. The nodes 202A, 202B may communicate with each other, for example, directly or indirectly, in each stage of the process 200. In some cases, the process 200 or individual operations within the process 200 can be executed by the nodes 202A, 202B over a period of seconds, or the process 200 may be executed over a shorter or longer period of time.

In the example shown in FIG. 2, each entity may correspond to a computing device, a computer system, an IP address or other network address, or another type of computer-readable identifier or instance of a computer resource. Accordingly, the computations and other operations of each entity may be performed by one or more processors or other elements of the respective node 202A, 202B. Similarly, information sent to or received by an entity may be sent to or received by an element (e.g., one or more processors, memories, or interfaces) of the respective node 202A, 202B.

In some examples, the cryptographic process 200 is secure against quantum-enabled adversaries such as, for example, the quantum-enabled adversary 108 shown in FIG. 1. For instance, in some cases, the example cryptographic process 200 is secure against certain types of attacks or other processes that can be performed by a quantum-enabled adversary who has access to public information exchanged between the server 202 and the client 204. The example cryptographic process 200 may also provide security against classically-enabled adversaries who do not have access to quantum computers or other quantum resources.

At 210A and 210B, the nodes 202A, 202B perform one or more cryptosystem setup operations. A supersingular isogeny-based cryptosystem can be described in terms of a supersingular elliptic curve E defined over a finite field $F_{p^2}$. Let p≥5 be a prime integer; let $F_{p^2}$ denote a finite field of characteristic p with $p^2$ elements; and let E be an elliptic curve defined over $F_{p^2}$. The cryptosystem setup operations at 210A, 210B can include defining the prime integer $p=l_A^n l_B^m f \pm 1$, where $l_A$ and $l_B$ are distinct prime integers, where f, n, and m are positive integers with f being coprime to $l_A$ and $l_B$, such that $l_A^n \approx l_B^m$. In some examples described here, $l_A=2$ and $l_B=3$, and $p=2^n 3^m f-1$, with f being coprime to 2 and 3, such that $2^n \approx 3^m$. In such examples, the elliptic curve E has $(2^n 3^m f)$ torsion points in the field $F_{p^2}$.

The cryptosystem setup operations at 210A, 210B can include defining elliptic curve points $P_A$, $Q_A$, $P_B$, $Q_B$ on the elliptic curve E, which are public parameters of the corresponding nodes 210A, 210B. For each elliptic curve point, a pair of numbers in the finite field $F_{p^2}$ can represent the x-coordinate and the y-coordinate. For instance, each coordinate can be expressed A+i*B for some integers A and B between 0 and p. Therefore, each elliptic curve point can be represented by four integers between 0 and p.

In examples where $l_A=2$ and $l_B=3$, $\{P_A, Q_A\}$ represents a basis of the set of $2^n$-torsion points $E[2^n]$, and $\{P_B, Q_B\}$ represents a basis of the set of $3^m$-torsion points $E[3^m]$; the order of elliptic curve points $P_A$ and $Q_A$ is $2^n$; and the order of elliptic curve points $P_B$ and $Q_B$ is $3^m$. Global system parameters p, E, $P_A$, $Q_A$, $P_B$, $Q_B$, p, $l_A$, $l_B$, f, n and m, which define a supersingular isogeny cryptosystem, can be published to, computed by, or otherwise made available to the nodes 202A, 202B. In some other examples, the global system parameters may be obtained in another manner.

When a cryptographic protocol is executed with these parameters, one of the entities works with isogenies whose kernel is contained in a set of elliptic curve points defined by $l_A^n$ (e.g., $E[2^n]$), and the other entity works with isogenies whose kernel is contained in a second set of elliptic curve points defined by $l_B^m$ (e.g., $E[3^m]$). In the examples described here, Alice and Bob agree that Alice will work over the set $E[2^n]$ and Bob will work over the set $E[3^m]$. The respective set of points used by each entity can be established by agreement between the entities, by selection of one of the entities (e.g., the entity that initiates the process 200 can make a selection), based on a relationship of the entities (e.g., server-client), or otherwise before or during execution of the process 200.

At 212A and 212B, the nodes 202A, 202B perform one or more operations to each generate a respective key pair. In some implementations, each respective node 202A, 202B produces a public-private key pair. For instance, a first public-private key pair for the first entity 202A ("Alice") may be produced at 212A, and a second public-private key pair for the second entity 202B ("Bob") may be produced at 212B. A public-private key pair of an entity includes a private key and a corresponding public key, which are related as proscribed by the cryptosystem. The private key is kept as a secret of the entity, while the public key can be published to other entities in the cryptosystem. A public-private key pair may be generated in another manner. In some cases, a public-private key pair can be used as a static key pair or an ephemeral key pair.

In the example process 200, each entity's private key is represented by a single integer ($\alpha$ for Alice, $\beta$ for Bob). However, private keys for supersingular isogeny-based cryptosystems can have another form. For instance, a private key may have the form $(\alpha_1, \alpha_2)$ for some integers $\alpha_1$ and $\alpha_2$. However, it is possible to choose the private key of the form $(1, \alpha)$ or $(\alpha, 1)$, so that it is given by a single integer $\alpha$.

In some examples, at 212A, the node 202A obtains a random integer $\alpha$, such that $0 \leq \alpha < 2^n$. Generally, the random integer can be in the range $0 \leq \alpha < l_A^n$, for any appropriate value of $l_A^n$. The random integer $\alpha$ is kept secret, as Alice's secret key. In some cases, Alice uses the random integer $\alpha$ as a static private key or as an ephemeral private key. In one example, the node 202A further uses the random integer $\alpha$ to obtain an elliptic curve point $G_A = P_A + [\alpha]Q_A$ on a first elliptic curve. Here, the pair of elliptic curve points $\{P_A, Q_A\}$ is a public parameter of the node 202A in the supersingular isogeny-based cryptosystem, and the elliptic curve point $G_A$ is a generator of the cyclic subgroup $<G_A>$. Here, $[\alpha]Q_A$ denotes scalar multiplication on the first elliptic curve, where the point $Q_A$ is added to itself $\alpha$ times.

In some examples, at 212B, a similar process can be performed by the node 202B in parallel to obtain a random integer $\beta$, which can be further used to determine an elliptic curve point $G_B = P_B + [\beta]Q_B$ on a first elliptic curve for determining a public key of the node 202B. Here, the pair of elliptic curve points $\{P_B, Q_B\}$ is the public parameter of the node 202B in the supersingular isogeny-based cryptosystem, and the elliptic curve point $G_B$ is a generator of the cyclic subgroup $<G_B>$. Here, $[\beta]Q_B$ denotes scalar multiplication on the first elliptic curve, where the point $Q_B$ is added to itself p times.

In a supersingular isogeny-based cryptography protocol (e.g., SIDH, SIKE, entity authentication protocols, etc.), the public key of the node 202A includes $E_A$, $\phi_A(P_B)$, $\phi_A(Q_B)$, and $\phi_A(R_B)$, wherein $E_A$ is the image curve; $\phi_A(P_B)$, $\phi_A(Q_B)$, and $\phi_A(R_B)$ are elliptic curve points. In some cases, $R_B$ is determined by $P_B - Q_B$. In this example, the image curve $E_A = E/<G_A>$ is the elliptic curve under the isogeny $\phi_A$; $\phi_A(P_B)$ is an elliptic curve point that is the image of $P_B$ under the isogeny $\phi_A$; $\phi_A(Q_B)$ is an elliptic curve point that is the image of $Q_B$ under the isogeny $\phi_A$; and $\phi_A(R_B)$ is an elliptic curve point that is the image of $R_B$ under the isogeny $\phi_A$.

In some examples, the isogeny $\phi_A: E \rightarrow E_A$ is an isogeny of degree $2^n$ with the kernel $<G_A>$. An isogeny is generally defined by its kernel, and the generator of the kernel determines the isogeny. As such, the elliptic curve point $G_A$ determines the isogeny $\phi_A$. The degree of an isogeny generally refers the order of its kernel, or equivalently, the order of the point that generates the kernel. Thus, the degree of the isogeny $\phi_A$ is the order of the kernel $<G_A>$, which is the order of the elliptic curve point $G_A$. The isogeny $\phi_A$ and the elliptic curve point $G_A$ can be maintained as secret information of the node 202A (Alice).

In the example process 200, a number of values are further obtained by each of the nodes 202A, 202B so as to determine the respective public keys. For example, the nodes 202A, 202B each obtain elliptic curves, image curves, elliptic curve points, image points, kernel points, and various representations of these and other cryptographic values in the various operations. Generally, each of these values can be computed or otherwise obtained in any suitable manner, and each of these values can be stored or represented in any suitable form or format.

In some instances, each of these values can be directly computed by operation of specialized cryptographic co-processors (e.g., point evaluation co-processor, scalar multiplication co-processor, image curve evaluation co-processor, etc.) programmed to perform a computation that produces that value. In some instances, each of these values can be retrieved from a remote or local memory or from another source, which are precomputed by the specialized co-processors or another processor. In some instances, the specialized co-processors may include Field Programmable Gate Array (FPGA), an ASIC (application specific integrated circuit), or a Graphics Processing Unit (GPU), or other type of processors.

In some examples, global system values of the cryptosystem, and other values can be received from memory (e.g., volatile or non-volatile memory); random integers (e.g., $\alpha$, $\beta$, etc.) or other random values can be received from a pseudorandom generator or another source; elliptic curve points, image curves, isogenies or values can be computed by a corporative computation of specialized cryptographic co-processors, a general-purpose processor, or another type of processor.

Each node 202A, 202B may perform its respective operations to generate the public-private key pairs in parallel (e.g., potentially at the same time) or in series, and the operations may be performed independent of, or in response to, information from the other node. In some examples, node 202A generates Alice's public-private key pair first, and then node 202B generates Bob's public-private key pair after receiving Alice's public key. The operations may be performed in another order, or in response to other conditions.

In some examples, cryptographic elements are determined by the respective nodes 202A, 202B through a series of operations using a pre-configured tree topology, which includes a plurality of nodes connected by edges. In some implementations, the nodes represent elliptic curve points and the edges represent the operations between two neighboring elliptic curve points. In some implementations, the size of the tree topology is defined by the value of $1_A{}^n$. For example, example tree topologies are described in detail in FIGS. 4, and 6-8. In some examples, the series of operations includes a plurality of scalar multiplications and a plurality of point evaluations. In some cases, the tree topology defines steps for performing the plurality of scalar multiplications and the plurality of point evaluations (e.g., in the process of computing an image curve or evaluating an isogeny). In some examples, the node 202B determines its public key or another type of cryptographic element by computing the image curve $E_B$ and the isogeny $\phi_B: E \to E_B$ using the same or a different tree topology according to the value of $1_B{}^m$.

In some implementations, the tree topology defines steps for performing a plurality of batches. Each of the plurality of batches may include one or more cryptographic operations, which are performed in parallel (e.g., concurrently, simultaneously, independently, etc.) by multiple cryptographic co-processors. Generally, a batch may include any numbers of operations that are within the capacity of the computational resources configured in the node. For example, if a node (e.g., 202 or 202B) is configured with 2 scalar multiplication co-processors and 2 point evaluation co-processors, a batch may perform 4 operations in parallel, including 2 scalar multiplications and 2 point evaluations to efficiently utilize the computational resources provided by the co-processors.

In some implementations, a batch may include two or more operation of the same type performed by two or more cryptographic co-processors of the same type. For example, a batch may include two or more scalar multiplications performed by two or more scalar multiplication co-processors or may include two or more point evaluations performed by two or more point evaluation co-processors. In some other implementations, a batch may include at least two operations of different types. For example, a batch may include one or more scalar multiplications and one or more point evaluations.

In some cases, after 212A, 212B, the public keys of the nodes 202A, 202B are sent between the nodes 202A, 202B. For example, the node 202A may send its public key (e.g., $X(\phi_A(P_B))$, $X(\phi_A(Q_B))$, and one of $E_A$ or $X(\phi_A(R_B))$) directly to the node 202B; or the node 202A may initiate transmission indirectly, for example, through a communication device or otherwise. (Here, the notation "X(.)" represents the x-coordinate of an elliptic curve point.) Similarly, in some examples, the node 202A may also receive the public key of the node 202B directly from the node 202B or through a communication device or otherwise. In some cases, the node 202B may obtain Alice's public key from the node 202A, from memory or another remote or local source. Moreover, information may be sent in multiple transmissions or a single transmission over one or more communication networks or other channels. All or part of the information can be transmitted over a public channel, and may be observed by a quantum-enabled adversary or another type of adversary. Moreover, information including the public keys may be sent in multiple transmissions or a single transmission over one or more communication networks or other channels. All or part of the information can be transmitted over a public channel, and may be observed by a quantum-enabled adversary or another type of adversary.

At 214A and 214B, the nodes 202A, 202B perform one or more operations to derive a shared secret. In some implementations, the nodes 202A, 202B produce a shared secret value that can subsequently be used for cryptographic correspondence. For instance, deriving the shared secret at 214A, 214B may produce a secret value that is known to both entities (Alice and Bob), but is not publicly known or easily derivable from public information. In some example SIDH protocols, the shared secret is the j-invariant value $(j(E_{AB})=j(E_{BA}))$ computed by one entity based on the public key of the other entity. In some cases, the protocol performed by each entity to derive the shared secret also validates the public key of the other entity. In some example SIKE protocols, the shared secret is the hash of the j-invariant value $(j(E_{AB})=j(E_{BA}))$.

In some examples, in order to derive the shared secret, the node 202B computes an image curve $E_{AB}$ under the isogeny $\psi_B: E_A \to E_{AB}$. Here, the isogeny $\psi_B$ is an isogeny of degree $3^m$ with kernel $<\phi_A(P_B)+[\beta]\phi_A(Q_B)>$. In some cases, the same pre-configured tree topology for determining the isogeny $\phi_B: E \to E_B$ of the node 202B can be used. In some other cases, a different tree topology can be used to determining the isogeny $\psi_B: E_A \to E_{AB}$ according to the value of $3^m$. In some examples, a tree topology may include one or more paths used to define steps in a supersingular isogeny-based cryptography method. In some cases, paths in a tree topology may be determined by the computation resources within a computer system, e.g., number and type of cryptographic co-processors. In some instances, paths in a pre-determined tree-topology may be updated depending on the changes in the computation resources.

In some cases, the node 202B computes a shared secret value based on the image curve $E_{AB}$. The shared secret value is "shared" in the sense that the secret value is known (or to be known) by Alice and Bob. In some examples, the shared secret is the j-invariant $j(E_{AB})$ of the image curve $E_{AB}$. The j-invariant of an elliptic curve is an element of the underlying finite field $F_{p^2}$, and it can be computed, for example, from the coefficients that define the elliptic curve. For example, the j-invariant of a Montgomery curve $(By^2=x^3+Ax^2+x)$ is given by $j=256(A^2-3)^3/(A^2-A)$. In this example, the j-invariant $j(E_{AB})$ can be represented as a pair of integer values each between 0 and p. In some implementations, the j-invariant can be computed or stored in another manner. In some cases, another value is used as the shared secret, for instance, another value that is based on or related to the j-invariant $j(E_{AB})$ of the image curve $E_{AB}$.

In some cases, the shared secret, is used to encrypt the private key of the node 202B, e.g., Enc(β). The public key, which may include Enc(β), $X(\phi_B(P_A))$, $X(\phi_B(Q_A))$, and one of $X(\phi_B(R_A))$ or $E_B$. of the node 202B is then sent to or shared with the node 202A.

Similarly, the node 202A determines its shared secret by computing the image curve $E_{BA}$ and the isogeny $\psi_A$: $E_B \rightarrow E_{BA}$ using the same pre-configured tree topology or a different tree topology according to the value of $2^n$. Here, the isogeny $\psi_A$ is an isogeny of degree $2^n$ with kernel $<\phi_B(P_A)+[\alpha]\phi_B(Q_A)>$. In some examples, the shared secret is the j-invariant $j(E_{BA})$ of the image curve $E_{BA}$. The node 202A, for example, may use the $j(E_{BA})$ to decrypt the Enc(β) to obtain β', which is further used to determine a decrypted generator $G_B'=P_B+[β']Q_B$.

In some implementations, the node 202A further performs certain operations to validate the public key. For instance, the node 202A may validate the public key received from the node 202B to improve integrity and security of the protocol 200. In some cases, the node 202A computes the image curve $E_B'=E/<G_B'>$ and the isogeny $\phi_B'$: $E \rightarrow E_B'$ using the pre-determined tree topology or a different tree topology. Here, the isogeny $\phi_B'$ is an isogeny of degree $3^m$ with kernel $<G_B'>$. The image curve $E_B'$ and image points $\phi_B'(P_A)$, $\phi_B'(Q_A)$, and $\phi_B'(R_A)$ can be computed and stored in any suitable manner, using the techniques discussed above with respect to generating Alice's public key at 212A. The image curve $E_B'$ and the isogeny $\phi_B'$: $E \rightarrow E_B'$ are used to determine check values of $X(\phi_B'(P_A))$, $X(\phi_B'(Q_A))$, and one of $E_B'$, or $X(\phi_B'(R_A))$, which are used to compare to the corresponding values in the public key of the node 202B for validation purposes.

At 216A and 216B, the shared secret (generated at 214A and 214B) is used for cryptographic correspondence. For example, the keys generated by a key agreement protocol may be used in in a supersingular isogeny-based cryptographic protocol to encrypt or decrypt a message, to sign or verify a message or to generate other parameters that are used for cryptographic correspondence. The keys may be used in another manner.

FIG. 3 is a block diagram showing example processors 300 in a computer system. The example processors 300 can include any type of data processor that execute computational tasks, for example, to generate a secret-public key pair and to verify a received public key from another node. For example, the processors 300 can run programs by executing or interpreting the scripts, functions, executables, or other modules contained in the programs. The processors 300 may perform one or more of the operations described, for example, with respect to FIG. 2.

The processors 300 can include various kinds of apparatus, devices, and machines for processing data, including, by way of example, a programmable data processor, a system on a chip, or multiple ones, or combinations, of the foregoing. Each of the processors 300 may include special purpose logic circuitry, e.g., an FPGA (field programmable gate array), an ASIC (application specific integrated circuit), or a Graphics Processing Unit (GPU). The processors 300 can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The processors 300 can include, by way of example, both general and special purpose microprocessors, and processors of any kind of digital computer The example processors 300 shown in FIG. 3 can include one or more chips or chipsets that include analog circuitry, digital circuitry or a combination thereof. In some cases, the processors 300 includes multiple processor devices such as, for example, one or more main processors and one or more cryptographic co-processors. For instance, the processors 300 may include a CPU 302 that can delegate certain computational tasks to a cryptographic co-processor, which may be configured to perform the computational tasks more efficiently than the CPU or in parallel with other computational tasks performed by other cryptographic co-processors or processor devices. In some examples, the cryptographic co-processors are used to traverse a pre-determined tree topology.

In the example of FIG. 3, the one or more cryptographic co-processors includes one or more point evaluation co-processors 304, and one or more scalar multiplication co-processors 306. In some implementations, the one or more cryptographic co-processor may include one or more image curve evaluation co-processors 308. In some cases, operations of the one or more cryptographic co-processors 304, 306, 308 are programmed according to a pre-configured tree topology, for example, for evaluating an isogeny φ of degree $l^n$ or computing an image curve.

In the example of FIG. 3, each of the point evaluation co-processors 304 is programmed to perform a point evaluation. In some implementations, a point evaluation co-processor 304 is programmed to compute an image point on an elliptic curve according to an image point on a neighboring elliptic curve. In some implementations, the point evaluation co-processors 304 are programmed to calculate point evaluations according to the other party's torsion group. For example, the point evaluation co-processors 304 of the node 202A in a SIDH protocol are programmed to calculate $\phi_{Ai}(P_B)$, $\phi_{Ai}(Q_B)$, and $\phi_{Ai}(R_B)$. Here, $\{P_B, Q_B\}$ the public parameter of the node 202B in the supersingular isogeny-based cryptosystem, $R_B=P_B-Q_B$, and i is a positive integer in a range of 0≤i<n.

In the example of FIG. 3, each of the scalar multiplication co-processors 306 is programmed to perform a scalar multiplication. In some cases, a scalar multiplication co-processor 306 is used to compute an image point on an elliptic curve based on another image point on the same elliptic curve via a scalar multiplication. For example, assuming n=5, the scalar multiplication co-processors 306 are used to determine a generator $[l^5]G_0$ of a first isogeny kernel. Here, $G_0$ is an elliptic curve point, which is a generator for the isogeny $\phi$ of higher degree ($l^n$). In some cases, the generator $G_0$ is defined as $G_0=P+[\alpha]Q$. Here, the pair of elliptic curve points $\{P, Q\}$ is a public parameter of a node in the supersingular isogeny-based cryptosystem. The first generator $[l^5]G_0$ of the first isogeny kernel is determined by performing a scalar multiplication [l] on the generator $G_0$ of the first elliptic curve $E_0$ 5 times.

In the example of FIG. 3, the image curve evaluation co-processors 308 of a node are programmed to perform a series of operations so as to determine one or more coefficients of a supersingular elliptic curve E as a part of its public key based on the isogeny of an degree of $l^n$. For example, the elliptic curve $E_A$ of a node 202A is determined after obtaining the isogeny $\phi_A$: $E \rightarrow E_A$.

In some examples, the operations of the cryptographic co-processors 304, 306, 308 may be prioritized, ordered, and coordinated by the CPU 302 so as to provide efficient management of the computational resources in each of the cryptographic co-processors 304, 306, 308. In some implementations, the operations of the cryptographic co-processors 304, 306 are programmed according to the pre-configured tree topology. For example, when using a pre-configured tree topology for the isogeny $\phi$ with a degree of $l^n$, the scalar multiplication co-processors 306 may be first used to determine a first generator of a first isogeny kernel on the first elliptic curve $E_0$; the point evaluation co-processors 304 may then be prioritized for computing generators over computing image points on the same elliptic curve; the point evaluation co-processors may be configured for computing multiple image points in a batch; and the image curve evaluation co-processors 308 may be configured to compute coefficients of an image curve according to the isogeny. In some implementations, calculation results obtained from each of the cryptographic co-processors in steps during the determination of the isogeny $\phi$ with a degree of $l^n$ can be stored in a memory which can be used as an input of other cryptographic co-processors in other steps. In some examples, the point evaluation processors 304 may be used as the image curve evaluation processors 308 for performing image curve evaluations.

Figure 4:
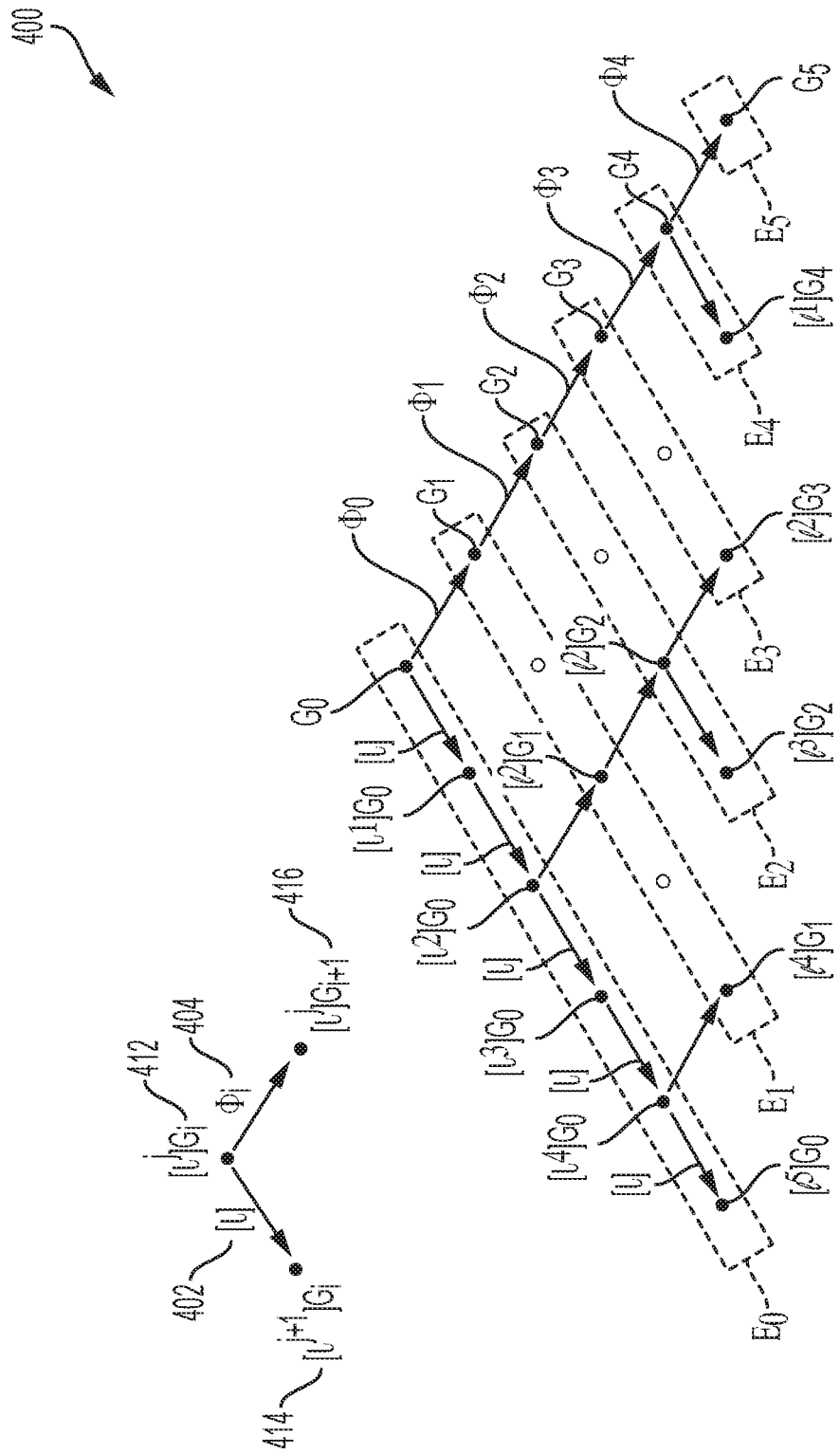
FIG. 4 is a schematic diagram showing an example tree topology for computing lower order isogeny kernels (order l) from a generator of an isogeny kernel having higher order ($l^n$).

FIG. 4 is a schematic diagram showing an example tree topology 400 for computing lower order isogeny kernels (order l) based on a generator ($G_0$) of an isogeny kernel having higher order ($l^n$). In the example shown in FIG. 4, n equals 6. The size (e.g., numbers of points and edges in the tree topology 400) is determined by the value of $l^n$; another value of n can be used.

In some implementations, the tree topology 400 defines operational steps and pathways to determine the values of generators (e.g., $[l^5]G_0$, $[l^4]G_1$, $[l^3]G_2$, $[l^2]G_3$, $[l^1]G_4$, and $G_5$) for the lower order isogeny kernels represented in the bottom row of the tree topology 400. In some cryptographic protocols, the generators of the isogeny kernels may be used to determine isogenies of lower degrees (l). In certain implementations, the isogenies with lower degrees (e.g., $\phi_5$, $\phi_4$, $\phi_3$, $\phi_2$, $\phi_1$, $\phi_0$) may be further used to apply or evaluate the isogeny $\phi$ (e.g., $\phi_A$ for node 202A and $\phi_B$ for node 202B) with a degree of $l^n$, for example, in the context generating the public key of a communication node (e.g., nodes 202A, 202B), verifying a public key received from a different communication node via a communication channel or other contexts.

In some implementations, the tree topology 400 is pre-configured by a program stored in a memory of a node and executed by a processor or cryptographic co-processors of the respective node. In some implementations, the tree topology 400 is used in various steps of a cryptographic protocol. For example, the same tree topology may be used in generating keys at 212A, 212B, and the same tree topology that is used for generating a public key can be also used in verifying a received public key and deriving shared secret at 214A, 214B. In some implementations, the tree topology 400 may be shared between node 202A, 202B. In some other implementations, the tree topology 400 defined by $1_A^n$ (e.g., E[$2^n$]) is used by one node (e.g., 202A) and a different tree topology defined by $1_B^m$ (e.g., E[$3^m$]) is used by the other node (e.g., 202B). In some implementations, the tree topology 400 is determined by minimizing the computational cost. For example, assuming the computational cost for scalar multiplication is p and the computational cost for each point evaluation is q, the tree topology can be determined by min(p·a+q·b). Here, a is the number of scalar multiplications in the tree topology and b is the number of point evaluations in the tree topology. The tree topology may be determined in another manner.

The example tree topology 400 includes nodes connected by edges. The twenty-one nodes in the tree topology 400 include a root node (which resides in the top level of the tree topology 400 and has no parent node), six leaf nodes (which reside in the bottom level of the tree topology 400 and have no child nodes) and fourteen intermediate nodes between the root node and the leaf nodes. The nodes in the tree topology correspond to generators of isogeny kernels. The nodes in higher levels of the tree correspond to generators of isogeny kernels of higher order. As such, the root node corresponds to a generator of an isogeny kernel ($G_0$) having the highest order (order $l^6$); the leaf nodes correspond to a plurality of generators ($[l^5]G_0$, $[l^3]G_2$, $[l^2]G_3$, $[l]G_4$, and $G_5$) of isogeny kernels having the lowest order (order l). The intermediate nodes correspond to generators of isogeny kernels having intermediate orders (order $l^i$, where i is an integer and $2 \leq i \leq 5$) associated with their respective levels in the tree. As shown in FIG. 4, the leaf nodes reside in the bottom level of the tree topology 400, at the end the diagonals. Nodes on the same diagonal are on the same elliptic curve corresponding to images points. For example, a first elliptic curve $E_0$ includes the root node (corresponding to the generator $G_0$) and five other nodes ($[l^5]G_0$, $[l^4]G_0$, $[l^3]G_0$, $[l^2]G_0$, and $[l]G_0$). Similarly, a second elliptic curve $E_1$ includes five nodes in the tree topology 400 (including the node corresponding to the generator $[l^4]G_1$); a third elliptic curve $E_2$ includes four nodes in the tree topology 400 (including the node corresponding to the generator $[l^3]G_2$); a fourth elliptic curve $E_3$ includes three nodes in the tree topology 400 (including the node corresponding to the generator $[l^2]G_3$); a fifth elliptic curve $E_4$ includes two nodes in the tree topology 400 (including the node corresponding to the generator $[l]G_4$); and a sixth elliptic curve $E_5$ includes a single nodes in the tree topology 400 (corresponding to the generator $G_5$).

In the example, the tree topology 400 further includes a plurality of edges representing a plurality of scalar multiplications 402 in a first direction and a plurality of point evaluations 404 in a second direction. Specifically, a scalar multiplication 402 in the first direction allows a computation of a point $[l^{j+1}]G_i$ 414 on an elliptic curve $E_i$ by multiplying a point $[l^j]G_i$ 412 on the same elliptic curve $E_i$ by [l] 402. A point evaluation 404 in the second direction for the isogeny $\phi_i$ 404 of degree 1 on the first point $[l^j]G_i$ 412 on the elliptic curve $E_i$ allows the computation of a point $[l^j]G_{i+1}$ 416 on an elliptic curve $E_{i+1}$.

In the example, determining the isogeny $\phi$ of degree $l^n$ may be decomposed into computations of n isogenies $\phi_i$ of degree 1. Here $\phi=\phi_{n-1}\circ\phi_{n-2}\circ\ldots\circ\phi_1\circ\phi_0$, in which operation "$\circ$" represents composition. In the example showing in FIG. 4, the isogeny $\phi$ can be determined by $\phi_5\circ\phi_4\circ\phi_3\circ\phi_2\circ\phi_1\circ\phi_0$, wherein the isogenies $\phi_0$, $\phi_1$, $\phi_2$, $\phi_3$, $\phi_4$, $\phi_5$ can be determined using their corresponding generators of the isogeny kernels, e.g., $[l^5]G_0$, $[l^4]G_1$, $[l^3]G_2$, $[l^2]G_3$, $[l]G_4$, $G_5$.

Specifically, the first generator $[l^5]G_0$ of the first isogeny kernel of the first isogeny $\phi_0$ on a first elliptic curve $E_0$ can be obtained by performing a scalar multiplication [l] on the generator $G_0$ 5 times. The first isogeny $\phi_0$ can be then determined according to the first generator $[l^5]G_0$ of the first isogeny kernel. The second generator $[l^4]G_1$ of a second isogeny kernel of a second isogeny $\phi_1$ on a second elliptic curve $E_1$ can be determined by performing a point evaluation for the first isogeny $\phi_0$ on an image point $[l^4]G_0$. Here, $\phi_0([l^4]G_0)=[l^4]\phi_0(G_0)=[l^4]G_1$. The second isogeny $\phi_1$ can be then determined according to the second generator $[l^4]G_1$ of the second isogeny kernel. A third generator $[l^3]G_2$ of the third isogeny kernel of a third isogeny $\phi_2$ on the third elliptic curve $E_2$ may be determined by performing a point evaluation for the isogeny $\phi_0$ on the point $[l^2]G_0$ and a point evaluation for the isogeny $\phi_1$ on the point $[l^2]G_1$ followed by a scalar multiplication [l] on the point $[l^2]G_2$. The third isogeny $\phi_2$ can be then determined according to the third generator $[l^3]G_2$ of the third isogeny kernel. A fourth generator $[l^2]G_3$ of a fourth isogeny kernel of a fourth isogeny $\phi_3$ on the fourth elliptic curve $E_3$ can be determined by performing a point evaluation for the isogeny $\phi_2$ on the point $[l^2]G_2$. Here, $\phi_2([l^2]G_2)=[l^2]\phi_2(G_2)=[l^2]G_3$. The fourth isogeny $\phi_3$ can be then determined according to the fourth generator $[l^2]G_3$ of the fourth isogeny kernel. A fifth generator $[l]G_4$ of the fifth isogeny kernel of the fifth isogeny $\phi_4$ on the fifth elliptic curve $E_4$ is determined by performing a series of point evaluations for isogenies $\phi_3$, $\phi_2$, $\phi_1$, and $\phi_0$ to obtain the point $G_4$. Here, $G_4=\phi_3\phi_2\phi_1\phi_0(G_0)$ followed by a scalar multiplication [l] on the point $G_4$. The fifth isogeny $\phi_4$ can be then determined according to the fifth generator $[l^1]G_4$ of the fifth isogeny kernel. A sixth generator $G_5$ of a sixth isogeny kernel of a sixth isogeny $\phi_5$ on a sixth elliptic curve $E_5$ can be then determined by performing a point evaluation for the fifth isogeny $\phi_4$ on the point $G_4$. Here, $G_5=\phi_4(G_4)$. The sixth isogeny $\phi_5$ can be then determined according to the sixth generator $G_5$ of the sixth isogeny kernel.

In certain implementations, as shown in FIG. 4, it is not necessary to calculate each point, by performing each scalar multiplication, or each point evaluation between any two neighboring points in the tree topology 400 in order to obtain the 6 generators of the isogeny kernels. For example, 10 intermediate nodes (between the root node and the leaf nodes of the tree topology 400) are computed through 4 scalar multiplications and 6 point evaluations; and 6 generators of isogeny kernels (the leaf nodes of the tree topology 400) are computed through 3 scalar multiplications and 3 point evaluations.

In certain implementations, points evaluation operations for the same isogeny on points of the same elliptic curve are not required to be completed prior to exhausting the computational operations for deriving the generators of the isogeny kernels. Some of the point evaluations can be delayed to one or more later batches so as to efficiently accommodate limited computational resources (e.g., a number of cryptographic co-processors). In some implementations, if there are 2 point evaluation co-processors, the point evaluation for the isogeny $\phi_0$ on the generator $G_0$ is performed in a separate, second batch after a first batch, which for example, may include a point evaluation for the isogeny $\phi_0$ on the points $[l^2]G_0$ by a first point evaluation co-processor and a point evaluation for the isogeny $\phi_0$ on the point $[l^4]G_0$ by a second point evaluation co-processor. In this case, the first batch includes 2 point evaluations with an identical domain and range. The domain is the first elliptic curve $E_0$ and the range is the second elliptic curve $E_1$.

In some implementations, a batch may include a point evaluation for a first isogeny $\phi_j$ and a point evaluation for a second isogeny $\phi_k$, where j and k are integers and $|j-k|\geq 2$. For example, as shown in FIG. 4, the second batch may include a first point evaluation for the first isogeny $\phi_0$ on the point $G_0$ by the first point evaluation co-processor and a second point evaluation for the third isogeny $\phi_2$ on the point $[l^2]G_2$ by the second point evaluation co-processor. In this case, the first and second point evaluations in the second batch typically have different domains and ranges. Specifically, the first point evaluation for the first isogeny $\phi_0$ has a first domain and a first range, while the second point evaluation for the third isogeny $\phi_2$ has a second domain and a second range. In this case, the first domain is the first elliptic curve $E_0$, the first range is the second elliptic curve $E_1$, the second domain is the third elliptic curve $E_2$ and the second range is the fourth elliptic curve $E_3$, in which the first domain, the second domain, the first range and the second range are all different, e.g., non-isomorphic elliptic curves.

In some implementations, the point evaluation for the second isogeny $\phi_1$ on the point $G_1$ is performed in a batch, while the point evaluation for the second isogeny $\phi_1$ on the point $[l^2]G_1$ is performed in a separate batch. For example, the point evaluation for the isogeny $\phi_1$ on the point $G_1$ is performed by the first point evaluation co-processor in a batch, which also includes the point evaluation for the third isogeny $\phi_2$ on the point $[l^2]G_2$ by the second point evaluation co-processor. Similarly, the point evaluation for the third isogeny $\phi_2$ on the point $G_2$ can be performed in a batch while the point evaluation for the third isogeny $\phi_2$ on the point $[l^2]G_2$ can be performed in a separate batch. Using this method, computational operations for deriving the generators of the isogeny kernels may be prioritized over other cryptographic operations (e.g., point evaluations). Delaying certain point evaluations of the same isogeny to a later time (e.g., divide into separate batches) so that point evaluations for deriving the generators of the isogeny kernels can be prioritized may allow improved scheduling of computational resources for efficient parallel or multi-thread computing.

In some implementations, during the process of computing the low-order generators on the bottom row of the tree, other cryptographic operations that are not defined by the tree topology can be also performed by the cryptographic co-processors. For example, as discussed in FIG. 2, during the key generation step 212A, 212B, the nodes 202A, 202B are typically required to perform point evaluations for each of the isogenies $\phi_i$ on the public parameters (P, Q, R) of the other nodes in the supersingular isogeny-based cryptosystem. Specifically, the node 202A determines $\phi_{Ai}(P_B)$, $\phi_{Ai}(Q_B)$, and $\phi_{Ai}(R_B)$, wherein i is an integer and i=0, . . . , 5; and the node 202B determines $\phi_{Bj}(P_A)$, $\phi_{Bj}(Q_A)$, and $\phi_{Bj}(R_A)$, wherein j is an integer and j=0, . . . , m. In some implementations, these point evaluations depend on the availability of the isogenies $\phi_j$ which are determined according to the computational steps defined by the tree topology.

These point evaluations can be performed by the point evaluation co-processors when the isogenies $\phi_j$ become available and the point evaluation co-processors are not occupied for other computational tasks defined in the tree topology. For example, when the node is in the process of a series of scalar multiplications, one or more point evaluations on the public parameter of the supersingular isogeny-based cryptosystem may be performed by one or more available point evaluation co-processors.

Figure 5:
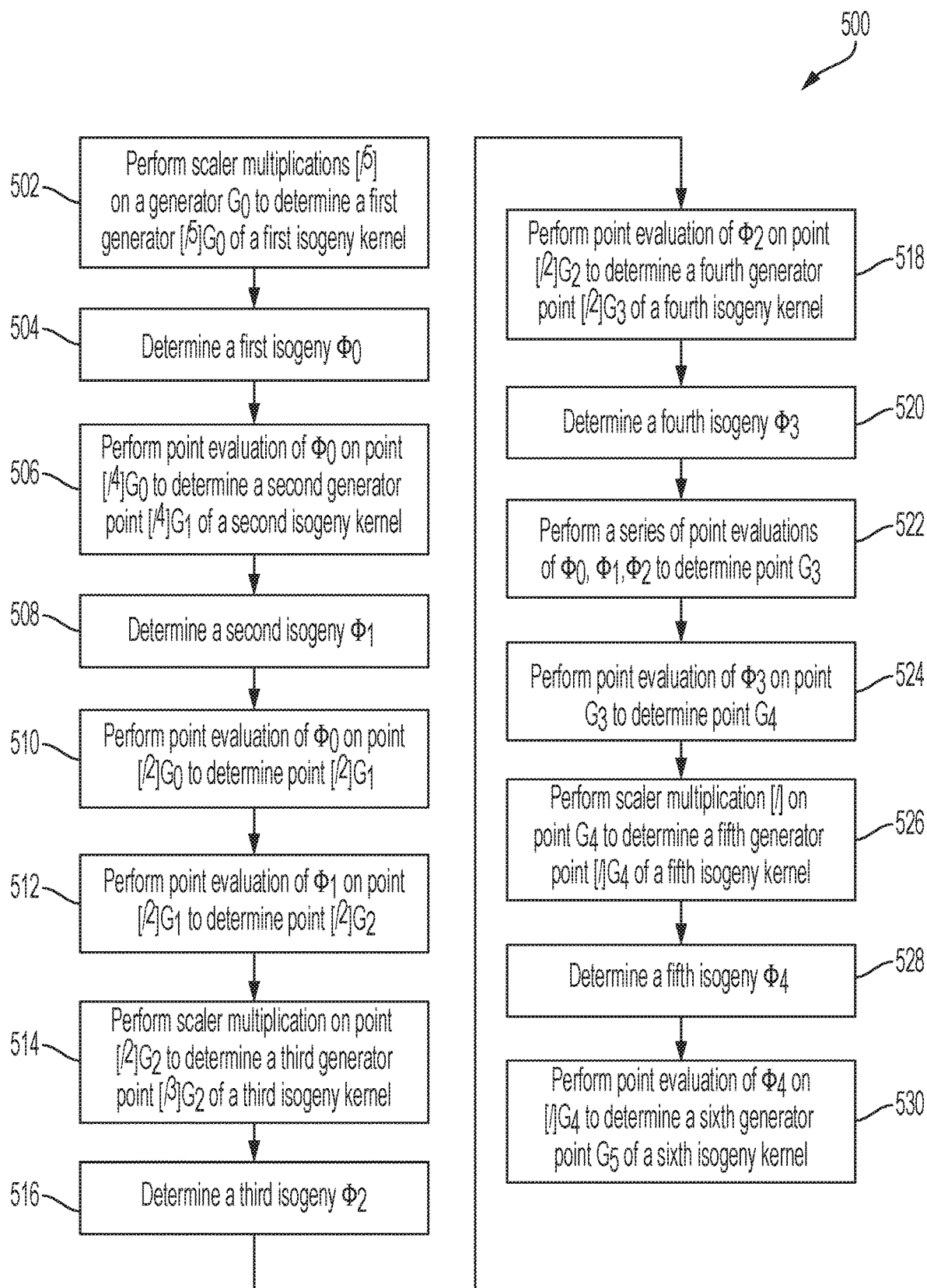
FIG. 5 is a flow diagram showing aspects of an example computational process according to a tree topology to determine lower order isogeny kernels (order l) from a generator of an isogeny kernel having higher order ($l^n$).

FIG. 5 is a flow diagram showing aspects of an example computational process 500 according to a tree topology to determine lower order isogeny kernels (order l) based on a generator ($G_0$) of an isogeny kernel having higher order ($l^n$). The example computational process 500 can be performed, for example, by a computer system. For instance, operations in the computational process 500 may be performed by either of the nodes 102, 104 in the example communication system 100 shown in FIG. 1 or in another type of system. The example process 500 may be further performed by a plurality of cryptographic co-processors 304, 306, 308 in the example processors 300 shown in FIG. 3. The example process 500 may include additional or different operations, including operations performed by additional or different entities, and the operations may be performed in the order shown or in another order.

In some cases, the operations in the example process 500 shown in FIG. 5 are implemented as processes to compute generators of isogeny kernels with a lower order (l) according to a pre-configured tree topology. For example, the processes shown in FIG. 5 can be implemented according to the example tree topology 400 shown in FIG. 4. In some cases, operations in the example process 500 can be combined, performed in batches, iterated or otherwise repeated or performed in another manner.

In some cases, the operations in the example process 500 can be performed by nodes 202A 202B, representing two distinct entities in a supersingular isogeny-based cryptosystem. Each entity may correspond to a computing device, a computer system, an IP address or other network address, or another type of computer-readable identifier or instance of a computer resource. Accordingly, the computations and other operations of each entity may be performed by one or more processors or cryptographic co-processors as shown in FIG. 3.

In some cases, the operations in the example process 500 can be a subroutine of a cryptographic process. For example, the operations in the example process 500 may be performed in a key generation process 212A, 212B or a shared secret derivation process 214A, 214B as shown in FIG. 2.

At 502, a series of scalar multiplications [l] is performed on a generator $G_0$ by 5 times to determine a first generator $[l^5]G_0$ of a first isogeny kernel. In some implementations, the generator $G_0$ on a first elliptic curve $E_0$ is defined as $G_0 = P + [\alpha]Q$. Here, the pair of elliptic curve points $\{P, Q\}$ is a public parameter of the supersingular isogeny-based cryptosystem, and α is a random integer ($0 \leq \alpha < l^n$). The random integer α is kept secret, as the secret key. The 5 scalar multiplications are performed in series by one or more scalar multiplication co-processors in the node. In some implementations, values of each point are stored in a memory of the node, for example a memory 110 as shown in FIG. 1. In some implementations, the series of scalar multiplications is performed in series by one or more scalar multiplication co-processor 304 as shown FIG. 3. All the nodes on the first elliptic curve obtained in the series of scalar multiplications are stored in a memory, for example a memory 110 of a node 102 as shown in FIG. 1, which may be used in a later operation for determining another nodes on the same elliptic curve or a different elliptic curve.

At 504, the first isogeny $\phi_0$ having a degree of l is determined according to the first generator $[l^5]G_0$ of the first isogeny kernel. In some implementations, operation 504 is performed by an image curve evaluation co-processor, for example the image curve evaluation co-processor 308 as shown in FIG. 3.

At 506, a point evaluation of the first isogeny $\phi_0$ on the image point $[l^4]G_0$ is performed to determine a second generator $[l^4]G_1$ of a second isogeny kernel on a second elliptic curve $E_1$. In some implementations, operation 506 is performed by a point evaluation co-processor.

At 508, the second isogeny $\phi_1$ having a degree of l is determined according to the second generator $[l^4]G_0$ of the second isogeny kernel. In some implementations, operation 508 is performed by an image curve evaluation co-processor, for example the image curve evaluation co-processor 308 as shown in FIG. 3.

At 510, a point evaluation of the first isogeny $\phi_0$ on the image point $[l^2]G_0$ is performed to determine an image point $[l^2]G_1$ on the second elliptic curve $E_1$. In some implementations, operation 510 is performed by a point evaluation co-processor.

In some implementations, operations 506, 510 can be performed by two separate point evaluation co-processors in a batch. In this case, the batch may further include 508.

At 512, a point evaluation of the second isogeny $\phi_1$ on the image point $[l^2]G_1$ is performed to determine an image point $[l^2]G_2$ on a third elliptic curve $E_2$. In some implementations, operation 512 is performed by a point evaluation co-processor.

At 514, a scalar multiplication is performed on the image point $[l^2]G_2$ to determine a third generator $[l^3]G_2$ of a third isogeny kernel on the third elliptic curve $E_2$. In some implementations, operation 514 is performed by a scalar multiplication co-processor.

At 516, the third isogeny $\phi_2$ having a degree of l is determined according to the third generator $[l^3]G_2$ of the third isogeny kernel. In some implementations, operation 516 is performed by an image curve evaluation co-processor, for example the image curve evaluation co-processor 308 as shown in FIG. 3.

At 518, a point evaluation of the third isogeny $\phi_2$ on the image point $[l^2]G_2$ is performed to determine a fourth generator $[l^2]G_3$ of a fourth isogeny kernel on a fourth elliptic curve $E_3$. In some implementations, operation 518 is performed by a point evaluation co-processor.

At 520, the fourth isogeny $\phi_3$ having a degree of l is determined according to the fourth generator $[l^2]G_3$ of the fourth isogeny kernel. In some implementations, operation 520 is performed by an image curve evaluation co-processor, for example the image curve evaluation co-processor 308 as shown in FIG. 3.

At 522, a series of point evaluations of the first, second, and third isogenies $\phi_0$, $\phi_1$, $\phi_2$ is performed to determine an image point $G_3$ on the fourth elliptic curve $E_3$. In some implementations, the series of point evaluations are performed separately by one or more point evaluation co-processors. In some implementations, certain sub-operations in operation 522 can be performed in the same batch together with other point evaluations performed by one or more point evaluation co-processors. For example, the point evaluation of the first isogeny $\phi_0$ on the generator $G_0$ in operation 522 and the point evaluation of the second isogeny $\phi_1$ on the point $[l^2]G_1$ in operation 512 may be performed by two separate point evaluation co-processors simultaneously in a batch. For another example, the point evaluation of the second isogeny $\phi_1$ on the image point $G_1$ and the point evaluation of the third isogeny $\phi_2$ on the point $[l^2]G_2$ in operation 518 may be performed by two separate point evaluation co-processors simultaneously in a batch.

At 524, a point evaluation of the fourth isogeny $\phi_3$ is performed on the image point $G_3$ to determine an image point $G_4$ on a fifth elliptic curve $E_4$. In some implementations, operation 524 is performed by one point evaluation co-processor.

At 526, a scalar multiplication performed on the image point $G_4$ to determine a fifth generator $[l]G_4$ of a fifth isogeny kernel on the fifth elliptic curve $E_4$. In some implementations, operation 526 is performed by a scalar multiplication co-processor.

At 528, the fifth isogeny $\phi_4$ having a degree of l is determined according to the fifth generator $[l]G_4$ of the fifth isogeny kernel. In some implementations, operation 528 is performed by an image curve evaluation co-processor, for example the image curve evaluation co-processor 308 as shown in FIG. 3.

At 530, a point evaluation of the fifth isogeny $\phi_4$ on the image point $G_4$ is performed to obtain the sixth generator $G_5$ of a sixth isogeny kernel on a sixth elliptic curve $E_5$. In some implementations, operation 530 is performed by one point evaluation co-processor. In some implementations, the sixth isogeny $\phi_5$ can be determined according to the sixth generator $G_5$. In some implementations, determining the sixth isogeny $\phi_5$ is performed by an image curve evaluation co-processor, for example the image curve evaluation co-processor 308 as shown in FIG. 3.

In some implementations, during the process of computing the generators of the isogeny kernels with low order (l) on the bottom row of the tree, other cryptographic operations that are not defined in the tree topology can be also performed. For example, as discussed in FIG. 2, during the key generation step 212A, 212B, the nodes 202A, 202B may perform point evaluations for each of the isogenies $\phi_j$ on the public parameters (P, Q, R) of the other nodes. Specifically, the node 202A determines $\phi_{Ai}(P_B)$, $\phi_{Ai}(Q_B)$, and $\phi_{Ai}(R_B)$ wherein i is an integer and i=0, . . . , 5; and the node 202B determines $\phi_{Bj}(P_A)$, $\phi_{Bj}(Q_A)$, and $\phi_{Bj}(R_A)$, wherein j is an integer and j=0, . . . , m. In some implementations, these point evaluations depend on the availability of the isogenies $\phi_j$ which are calculated according to the tree topology. These point evaluations can be performed by the point evaluation co-processors once the isogenies $\phi_j$ become available and the point evaluation co-processors are not occupied for other computational tasks defined in the tree topology. For example, when the algorithm is in the process of a series of scalar multiplications, the point evaluation co-processors may be used to perform point evaluations for each of the isogenies on the public parameter of the supersingular isogeny-based cryptosystem.

In some implementations, after obtaining the sixth isogeny $\phi_5$, the isogeny $\phi$ with a degree of l" may be determined using $\phi=\phi_{n-1}\circ\phi_{n-2}\circ\phi_1\circ\phi_0$, in which operation "$\circ$" represents composition.

Figure 6:
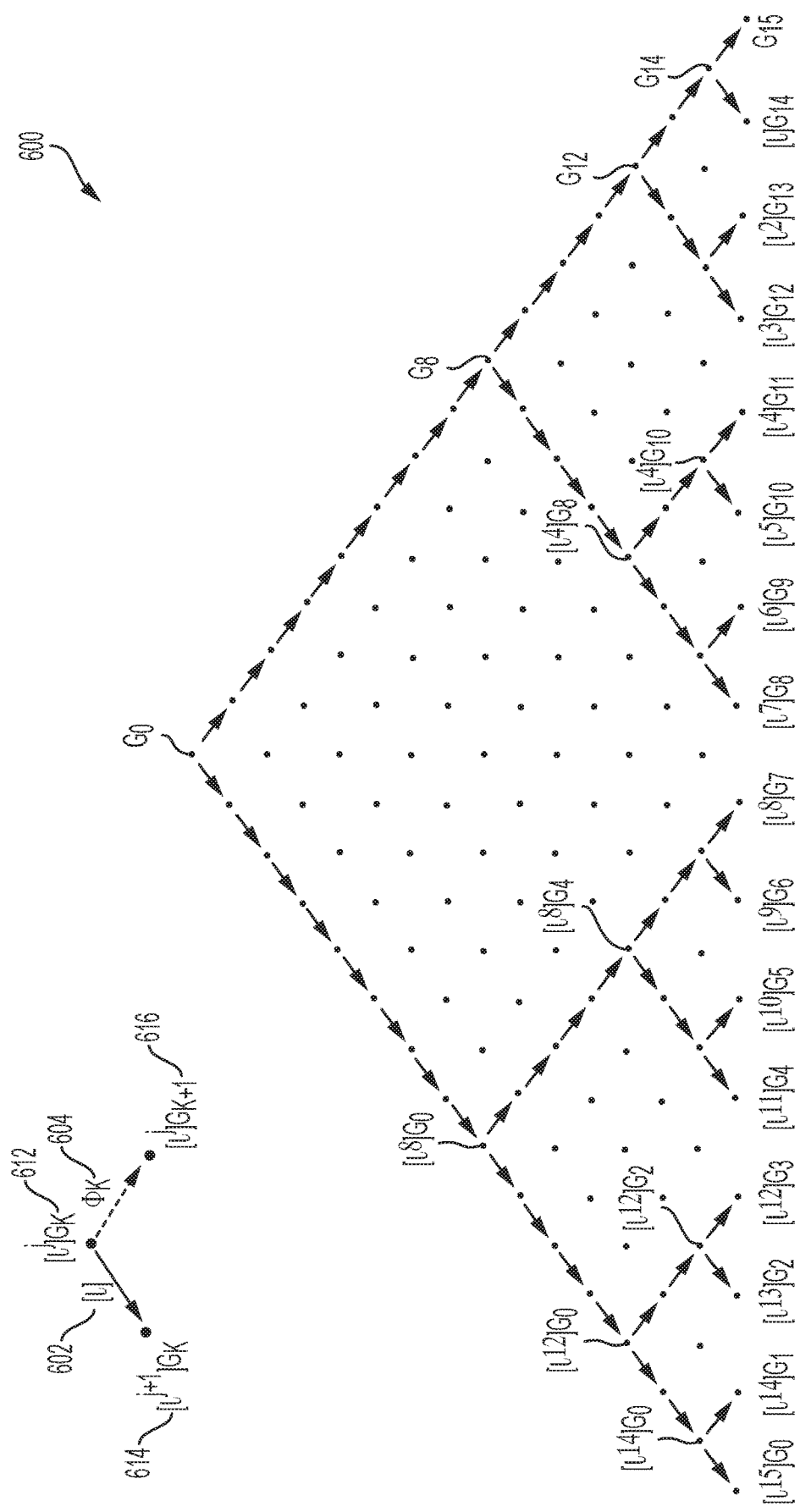
FIG. 6 is a schematic diagram showing an example tree topology for computing lower order isogeny kernels (order l) from a generator of an isogeny kernel having higher order ($l^n$).

FIG. 6 is a schematic diagram showing an example tree topology 600 for computing lower order isogeny kernels (order l) based on a generator ($G_0$) of an isogeny kernel having higher order (l"). In the example shown in FIG. 6, n equals 16. In some implementations, the number of potential nodes and edges in a tree topology is determined by n. The number of nodes and edges that are used is determined by n, l, and the number of scalar multiple and point evaluation co-processors.

In some implementations, the tree topology 600 defines operational steps and pathways to determine the values of generators (e.g., $[l^{15}]G_0$, $[l^{14}]G_1$, . . . , $[l]G_{14}$, and $G_{15}$) for the lower order isogeny kernels represented in the bottom row of the tree topology 600. In some cryptographic protocols, the generators of the isogeny kernels may be used to determine isogenies of lower degrees (l). In certain implementations, the isogenies with lower degrees (e.g., $\phi_{15}$, $\phi_{14}$, . . . , $\phi_{14}$, . . . , $\phi_1$, $\phi_0$) may be used to apply or evaluate the isogeny $\phi$ (e.g., $\phi_A$ for node 202A and $\phi_B$ for node 202B) with a degree of l", for example, in the context of generating a shared secret, generating the public key of a communication node (e.g., nodes 202A, 202B), verifying a public key received from a different communication node via a communication channel or other contexts.

In some implementations, the tree topology 600 is preconfigured by a program stored in a memory of a node and executed by a processor or cryptographic co-processors of the respective node. In some implementations, the tree topology 600 is used in various steps of a cryptographic protocol. For example, the same tree topology can be used in generating keys at 212A, 212B, and the same tree topology can be used in verifying a public key and derive shared secret at 214A, 214B. In some implementations, the tree topology 600 is shared between nodes 202A, 202B. In some implementations, the tree topology 600 defined by $l_A{}^n$ (e.g., $E[2^n]$) is used by one node (e.g., 202A) and a different tree topology defined by $l_B{}^m$ (e.g., $E[3^m]$) is used by the other node (e.g., 202B).

The example tree topology 600 includes nodes connected by edges. The one hundred-and-thirty-six nodes in the tree topology 600 include a root node (which resides in the top level of the tree topology 600 and has no parent node), sixteen leaf nodes (which reside in the bottom level of the tree topology 600 and have no child nodes) and a hundred and nineteen intermediate nodes between the root node and the leaf nodes. The nodes in the tree topology correspond to generators of isogeny kernels. The nodes in higher levels of the tree correspond to generators of isogeny kernels of higher order. As such, the root node corresponds to a generator of an isogeny kernel ($G_0$) having the highest order (order $l^{16}$); the leaf nodes correspond to a plurality of generators (e.g., $[l^{16-i-1}]G_i$, i=0, . . . , 15) of isogeny kernels having the lowest order (order l). The intermediate nodes correspond to generators of isogeny kernels having intermediate orders (order $l^i$, where i is an integer and $2\le i \le 15$) associated with their respective levels in the tree. As shown in FIG. 6, the leaf nodes reside in the bottom level of the tree topology 600, at the end the diagonals. Nodes on the same diagonal are on the same elliptic curve corresponding to images points. For example, a first elliptic curve $E_0$ includes the root node (corresponding to the generator $G_0$) and fifteen other nodes corresponding to image points $[l^{16-i}]G_0$, where i=15, . . . , 1 (which are also generators). Similarly, a second elliptic curve $E_1$ includes fifteen nodes (e.g., $[l^{16-i-1}]G_1$, i=15, . . . , 1) including a second generator $[l^{14}]G_1$ of a second isogeny kernel; and generally, a k-th elliptic curve $E_k$ includes 16-k nodes (e.g., $[l^{16-i-k}]G_k$, i=15, . . . , 1) including one generator $[l^{16-k-1}]G_k$ of an isogeny kernel, in which k=0, 1, . . . , 15.

In the example, the tree topology 600 includes a plurality of edges representing a plurality of scalar multiplications 602 in a first direction and a plurality of point evaluations 604 in a second direction. Specifically, a scalar multiplication 602 in the first direction determines a first image point 614 $[l^{j+1}]G_k$ on an elliptic curve $E_k$ based on a second image point $[l^j]G_k$ 612 on the same elliptic curve $E_k$. A point evaluation 604 in the second direction for the isogeny $\phi_k$ having a degree of l determines a third image point $[l^j]G_{k+1}$ 616 on an elliptic curve $E_{k+1}$ based on the second point $[l^j]G_k$ 612 on the elliptic curve $E_k$. Here, j=16 k-i, k=0, 1, ..., 15, and i=16-k, ..., 1.

In the example, determining the isogeny $\phi$ having a degree of $l^{16}$ may be decomposed into computations of 16 isogenies $\phi_k$ each having a degree of l. Here $\phi=\phi_{15}\circ\phi_{14}\circ\phi_{13}\ldots\phi_1\circ\phi_0$, wherein each of the isogenies $\phi_k$ can be determined using their corresponding generators $[l^{16-k-1}]G_k$ of the isogeny kernels. Here, k=0, 1, ... 15.

Specifically, a first generator $[l^{15}]G_0$ of a first isogeny kernel on a first elliptic curve $E_0$ can be obtained by performing a scalar multiplication [l] on the generator $G_0$ 15 times. A first isogeny $\phi_0$ can be then determined according to the first generator $[l^{15}]G_0$ of the first isogeny kernel. A second generator $[l^{14}]G_1$ of a second isogeny kernel on a second elliptic curve $E_1$ can be determined by performing a point evaluation for the first isogeny $\phi_0$ on a point $[l^{14}]G_0$. Here, $\phi_0([l^{14}]G_0)=[l^{14}]\phi_0(G_0)=[l^{14}]G_1$. A second isogeny $\phi_1$ can be then determined according to the second generator $[l^{14}]G_1$ of the second isogeny kernel. A third generator $[l^{13}]G_2$ of a third isogeny kernel may be determined by performing a point evaluation for the first isogeny $\phi_0$ on an image point $[l^{12}]G_0$ and a point evaluation for the second isogeny $\phi_1$ on an image point $[l^{12}]G_1$ followed by a scalar multiplication [l] on the image point $[l^{12}]G_2$. A third isogeny $\phi_2$ can be then determined according to the third generator $[l^{13}]G_2$ of the third isogeny kernel on a third elliptic curve $E_2$. A fourth generator $[l^{12}]G_3$ of a fourth isogeny kernel can be determined by performing a point evaluation for the third isogeny $\phi_2$ on the image point $[l^{12}]G_2$. Here, $\phi_2([l^{12}]G_2)=[l^{12}]\phi_2(G_2)=[l^{12}]G_3$. A fourth isogeny $\phi_3$ can be then determined according to the fourth generator $[l^{12}]G_3$ of the fourth isogeny kernel.

In the example tree topology 600 shown in FIG. 6, a fifth generator $[l^{11}]G_4$ of a fifth isogeny kernel on a fifth elliptic curve $E_4$ is determined by determining one image point on the same elliptic curve $E_4$. A series of point evaluations may be performed after obtaining the isogenies $\phi_0, \phi_1, \phi_2, \phi_3$ so as to compute one image point on the fifth elliptic curve $E_4$ based on an image point on the first elliptic curve $E_0$. In some cases, the image point on the first elliptic curve $E_0$ is determined according to the number of isogenies that have already been obtained. For example, as shown in FIG. 6, an image point $[l^8]G_0$ is used to determine an image point $[l^8]G_4$ by performing a series of point evaluations. Specifically, a point evaluation for the first isogeny $\phi_0$ is performed on the image point $[l^8]G_0$ on the first elliptic curve $E_0$ to obtain an image point $[l^8]G_1$ on the second elliptic curve $E_1$; a point evaluation for the second isogeny $\phi_1$ is performed on the image point $[l^8]G_1$ on the second elliptic curve $E_1$ to obtain an image point $[l^8]G_2$ on the third elliptic curve $E_2$; a point evaluation for the third isogeny $\phi_2$ is performed on the image point $[l^8]G_2$ on the third elliptic curve $E_2$ to obtain an image point $[l^8]G_3$ on the fourth elliptic curve $E_3$; and a point evaluation for the fourth isogeny $\phi_3$ is performed on the image point $[l^8]G_3$ on the fourth elliptic curve $E_3$ to obtain an image point $[l^8]G_4$ on the fifth elliptic curve $E_4$.

To further compute the fifth generator $[l^{11}]G_4$, a scalar multiplication [l] is performed on the image point $[l^8]G_4$ 3 times. A fifth isogeny $\phi_4$ can be then determined according to the fifth generator $[l^{11}]G_4$ of the fifth isogeny kernel. A sixth generator $[l^1]G_5$ of a sixth isogeny kernel on a sixth elliptic curve $E_5$ can be determined by performing a point evaluation for the fifth isogeny $\phi_4$ on an image point $[l^{10}]G_4$. Here, $\phi_4([l^{10}]G_4)=[l_{10}]\phi_4(G_4)=[l^{10}]G_5$. A sixth isogeny $\phi_5$ can be then determined according to the sixth generator $[l^{10}]G_5$ of the sixth isogeny kernel.

A seventh generator $[l^9]G_6$ of a seventh isogeny kernel may be determined by performing a point evaluation for the fifth isogeny $\phi_4$ on an image point $[l^8]G_4$ and a point evaluation for the sixth isogeny $\phi_5$ on an image point $[l^8]G_5$ followed by a scalar multiplication [l] on an image point $[l^8]G_6$. A seventh isogeny $\phi_6$ can be then determined according to the seventh generator $[l^9]G_6$ of the seventh isogeny kernel on a seventh elliptic curve $E_7$. An eighth generator $[l^8]G_7$ of an eighth isogeny kernel can be determined by performing a point evaluation for the seventh isogeny $\phi_6$ on the image point $[l^8]G_6$. Here, $\phi_6([l^8]G_6)=[l^8]\phi_6(G_6)=[l^8]G_7$. An eighth isogeny $\phi_7$ can be then determined according to the eighth generator $[l^8]G_7$ of the eighth isogeny kernel on an eighth elliptic curve $E_8$.

In the example tree topology 600 shown in FIG. 6, a ninth generator $[l^7]G_8$ of a ninth isogeny kernel on a ninth elliptic curve $E_8$ is determined by determining one image point on the same elliptic curve $E_8$. A series of point evaluations may be performed after obtaining the isogenies $\phi_0, \phi_1, \phi_2, \phi_3, \phi_4, \phi_5, \phi_6, \phi_7$ so as to compute one image point on the ninth elliptic curve $E_8$ based on an image point on the first elliptic curve $E_0$. In some cases, the image point on the first elliptic curve $E_0$ is determined according to the number of isogenies that have already been obtained. For example, as shown in FIG. 6, the generator $G_0$ of the isogeny kernel of the order of l" is used to determine an image point $G_8$ by performing a series of point evaluations. In some implementations, a similar process for determining the first 8 generators can be used to determine the rest of the generators of the isogeny kernels, which is not repeated here for clarity purposes.

In certain implementations, as shown in FIG. 6, it is not necessary to calculate each nodes, perform each scalar multiplication between two adjacent points, or each point evaluation between adjacent points in the tree topology 600 in order to obtain the 16 generators of isogeny kernels of the order of l. For example, only 48 intermediate nodes out of 120 images points are computed through 24 scalar multiplications and 24 point evaluations; and 16 generators of isogeny kernels of the order of l are computed through 8 scalar multiplications and 8 point evaluations.

In some implementations, a node, for example Nodes 202A 202B as shown in FIG. 2, may be configured with 2 point evaluation co-processors and 1 scalar multiplication co-processor. In this case, 2 point evaluations can be performed in a batch simultaneously by the 2 point evaluation co-processors. For example, the point evaluation for the first isogeny $\phi_0$ on the image point $[l^{14}]G_0$ by a first point evaluation co-processor and the point evaluation for the first isogeny $\phi_0$ on the image point $[l^{12}]G_0$ by a second point evaluation co-processor may be performed in a batch. For another example, the point evaluation for the first isogeny $\phi_0$ on the image point $[l^8]G_0$ by the first point evaluation co-processor and the point evaluation for the second isogeny $\phi_1$ on the image point $[l^{12}]G_1$ by the second co-processor may be performed in a batch. For another example, the point evaluation for the second isogeny $\phi_1$ on the image point $[l^8]G_1$ and the point evaluation for the first isogeny $\phi_0$ on the generator $G_0$ are performed in a batch, which may also include the scalar multiplication on the image point $[l^{12}]G_2$ by the scalar multiplication co-processor.

In certain implementations, points evaluation operations for the same isogeny on points of the same elliptic curve are not required to be completed prior to exhausting the computational operations for deriving the generators of the isogeny kernels. Some of the point evaluations can be delayed to one or more later batches so as to efficiently accommodate limited computational resources (e.g., a number of cryptographic co-processors). For example, assuming there are 2 point evaluation co-processors, the point evaluation for the first isogeny $\phi_0$ on the image point $[1^8]G_0$ and the point evaluation for the first isogeny $\phi_0$ on the point $G_0$ may be performed in a batch after the second generator $[1^{14}]G_1$ of the second isogeny kernel is determined. In this case, the batch includes 2 point evaluations with an identical domain and range. The domain is the first elliptic curve $E_0$ and the range is the second elliptic curve $E_1$. For another example, the point evaluation for the third isogeny $\phi_2$ on the point $G_2$ may be performed after the fourth generator $[1^{12}]G_3$ of the fourth isogeny kernel is determined.

In some implementations, a batch may include a point evaluation for a first isogeny $\phi_j$ and a point evaluation for a second isogeny $\phi_k$, where j and k are integers and $|j-k|\geq 2$. For example, as shown in FIG. 6, a batch may include a first point evaluation for the second isogeny $\phi_1$ on the image point $G_1$ by the first point evaluation co-processor and a second point evaluation for the fourth isogeny $\phi_3$ on the image point $[1^8]G_3$ by the second point evaluation co-processor. In this case, the first and second point evaluations in the batch have different domains and ranges. Specifically, the first point evaluation for the second isogeny $\phi_1$ has a first domain and a first range, while the second point evaluation for the fourth isogeny $\phi_3$ has a second domain and a second range. In this case, the first domain is the first elliptic curve $E_1$, the first range is the second elliptic curve $E_2$, the second domain is the third elliptic curve $E_3$ and the second range is the fourth elliptic curve $E_4$, in which the first domain, the second domain, the first range and the second range are all different, e.g., non-isomorphic elliptic curves.

In some implementations, point evaluations for the same isogeny on points on the same elliptic curve may be performed in separate batches. In some implementations, point evaluations for the same isogeny on points that are located closer to the generators of the isogeny kernels at the bottom of the tree topology have a higher priority over the point evaluations for the same isogeny on points that are located closer to the point $G_0$ at the top of the tree topology. For example, the point evaluation for the second isogeny $\phi_1$ on the point $G_1$ may be performed by a point evaluation co-processor in a batch, while the point evaluation for the second isogeny $\phi_1$ on the image point $[1^8]G_1$ may be performed by a point evaluation co-processor in an earlier batch. Using this method, computational operations for computing the generators of the isogeny kernels is prioritized over other cryptographic operations (e.g., point evaluations). Delaying certain point evaluations of the same isogeny to a later time (e.g., divide into separate batches) so that point evaluations for computing the generators of the isogeny kernels can be prioritized provides advantages such as, for example improved scheduling of computational resources for efficient parallel or multi-thread computing (e.g., multi-thread software or multi-thread hardware).

In some implementations, during the process of computing the generators of the isogeny kernels represented in the bottom row of the tree topology 600 as shown in FIG. 6, other cryptographic operations that are not defined in the tree topology can be also performed. For example, as discussed in FIG. 2, during the key generation step 212A, 212B, the nodes 202A, 202B may be required to perform point evaluations for each of the isogenies $\phi_i$ on the public parameters (P, Q R) of the other nodes. Specifically, the node 202A determines $\phi_{Ai}(P_B)$, $\phi_{Ai}(Q_B)$, and $\phi_{Ai}(R_B)$, wherein i is an integer and i=0, 1, . . . , 15; and the node 202B determines $\phi_{Bj}(P_A)$, $\phi_{Bj}(Q_A)$, and $\phi_{Bj}(R_A)$, wherein j is an integer and j=0, 1, . . . , m. In some implementations, these point evaluations depend on the availability of the isogenies $\phi_j$ which are calculated according to the tree topology 600. These point evaluations can be performed by the point evaluation co-processors when the isogenies $\phi_j$ become available by obtaining the corresponding generators of the isogeny kernels and also when the point evaluation co-processors are not occupied for other computational tasks defined in the tree topology 600. For example, when the series of scalar multiplications on the image point $[1^8]G_4$ to obtain the fifth generator $[1^{11}]G_4$ of the fifth isogeny kernel are performed, one or more of the point evaluation co-processors may be idle, which can be used for performing point evaluations on the public parameter of the supersingular isogeny-based cryptosystem.

In some implementations, after obtaining the sixteenth isogeny $\phi_{15}$, the isogeny $\phi$ with a degree of $1^{16}$ may be determined using $\phi=\phi_{15}\circ\phi_{14}\circ\ldots\circ\phi_1\circ\phi_0$, in which operation "$\circ$" represents composition.

Figure 7:
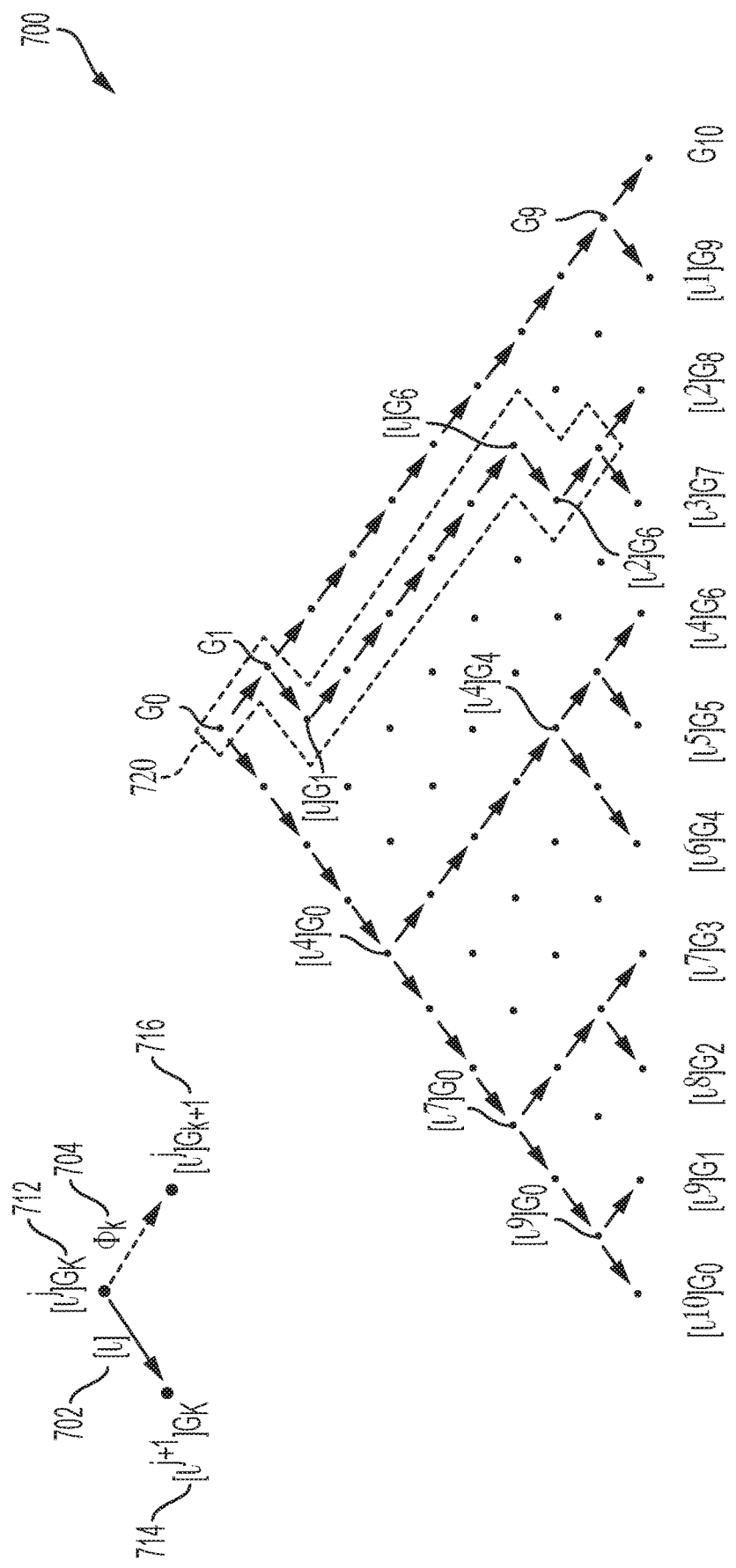
FIG. 7 is a schematic diagram showing an example tree topology with a zigzag path for computing lower order isogeny kernels (order l) from a generator of an isogeny kernel having higher order ($l^n$).

FIG. 7 is a schematic diagram showing an example tree topology 700 with a zigzag path for computing a lower order isogeny kernel (order 1) based on a generator ($G_0$) of an isogeny kernel having higher order ($1^n$). In the example shown in FIG. 7, n equals 11. The size (e.g., numbers of nodes and operations in the tree topology 700) is determined by the value of $1^n$; another value of n can be used.

In some implementations, the tree topology 700 defines operational steps and pathways to determine the values of generators (e.g., $[1^{10}]G_0$, $[1^9]G_1$, . . . , $[1]G_9$, and $G_{10}$) for the lower order isogeny kernels represented in the bottom row of the tree topology 700. In some cryptographic protocols, the generators of the isogeny kernels may be used to determine isogenies of lower degrees (l). In certain implementations, the isogenies with lower degrees (e.g., $\phi_{10}$, $\phi_9$, . . . , $\phi_1$, $\phi_0$) may be used to apply or evaluate the isogeny $\phi_0$ (e.g., $\phi_A$ for node 202A and $\phi_B$ for node 202B) with a degree of $1^n$, for example, in the context generating the public key of a communication node (e.g., nodes 202A, 202B), verifying a public key received from a different communication node via a communication channel or other contexts.

In some implementations, the tree topology 700 is preconfigured by a program stored in a memory of a node and executed by a processor or cryptographic co-processors of the respective node. In some implementations, the tree topology 700 is used in various steps of a cryptographic protocol. For example, the same tree topology can be used in generating keys at 212A, 212B, and the same tree topology can be used in verifying a public key and derive shared secret at 214A, 214B, as shown in FIG. 2. In some implementations, the tree topology 700 is shared between node 202A, 202B. In some other implementations, the tree topology 700 defined by $1_A{}^n$ (e.g., E[$2^n$]) is used by one node (e.g., 202A) and a different tree topology defined by $1_B{}^m$ (e.g., E[$3^m$]) is used by the other node (e.g., 202B). In some implementations, during SIKE, nodes may compute their tree topologies during a key generation process or during a process for calculating a shared secret. In some instances, a node may also compute a public key of the other node to validate the public key.

The example tree topology 700 includes nodes connected by edges. The sixty-six nodes in the tree topology 700 include a root node (which resides in the top level of the tree topology 700 and has no parent node), eleven leaf nodes (which reside in the bottom level of the tree topology 700 and have no child nodes) and fifty five intermediate nodes between the root node and the leaf nodes. The nodes in the tree topology correspond to generators of isogeny kernels. The nodes in higher levels of the tree correspond to generators of isogeny kernels of higher order. As such, the root node corresponds to a generator of an isogeny kernel ($G_0$) having the highest order (order $l^{11}$); the leaf nodes correspond to a plurality of generators (e.g., $[l^{10-i}]G_i$, i=0, . . . , 10) of isogeny kernels having the lowest order (order l). The intermediate nodes correspond to generators of isogeny kernels having intermediate orders (order $l^i$, where i is an integer and 2≤i≤10) associated with their respective levels in the tree. As shown in FIG. 7, the leaf nodes reside in the bottom level of the tree topology 700, at the end the diagonals. Nodes on the same diagonal are on the same elliptic curve corresponding to images points. For example, a first elliptic curve $E_0$ includes 11 nodes $[l^{10-i}]G_0$, i=10, . . . , 0 including a generator $[l^{10}]G_0$, Similarly, a second elliptic curve $E_1$ includes 10 nodes $[l^{9-i}]G_1$, i=9, . . . , 0 including 1 generator $[l^9]G_0$; and generally, a k-th elliptic curve $E_k$ includes 11–k nodes $[l^{11-k-i}]G_k$, i= 11–k, . . . , 0, including 1 generator $[l^{10-k}]G_k$ of an isogeny kernel, in which k=0, 1, . . . , 10.

In the example, the tree topology 700 includes a plurality of edges representing a plurality of scalar multiplications 702 in a first direction and a plurality of point evaluations 704 in a second direction. Specifically, a scalar multiplication 702 in the first direction determines a first image point $[l^{j+1}]G_k$ 714 on an elliptic curve $E_k$ based on a second image point $[l^j]G_k$ 712 on the same elliptic curve $E_k$. A point evaluation 704 in the second direction for the isogeny $\phi_{15-k}$ having a degree of l on the first image point $[l^j]G_k$ 712 on the elliptic curve $E_k$ determines a third image point $[l^j]G_{k+1}$ 716 on an elliptic curve $E_{k+1}$. Here, j=11–k–i, k=0, 1, . . . , 11, and i=11–k, . . . , 1.

In the example, determining the isogeny $\phi$ having a degree of $l^{11}$ may be decomposed into computations of 11 isogenies $\phi_k$ each having a degree of l. Here $\phi = \phi_{10} \circ \phi_9 \ldots \phi_1 \circ \phi_0$, wherein each of the isogenies $\phi_k$ can be determined using their corresponding generators $[l^{10-k}]G_k$ of the isogeny kernels. Here, k=0, 1, . . . 10.

Specifically, a first generator $[l^{10}]G_0$ of a first isogeny kernel on a first elliptic curve $E_0$ can be obtained by performing a scalar multiplication [l] on the generator $G_0$ 10 times. A first isogeny $\phi_0$ can be then determined according to the first generator $[l^{10}]G_0$ of the first isogeny kernel. A second generator $[l^9]G_1$ of a second isogeny kernel on a second elliptic curve $E_1$ can be determined by performing a point evaluation for the first isogeny $\phi_0$ on the point $[l^9]G_0$. Here, $\phi_0([l^9]G_0) = [l^9]\phi_0(G_0) = [l^9]G_1$. A second isogeny $\phi_1$ can be then determined according to the second generator $[l^9]G_1$ of the second isogeny kernel.

A third generator $[l^8]G_2$ of a third isogeny kernel may be determined by performing a point evaluation for the first isogeny $\phi_0$ on the image point $[l^7]G_0$ and a point evaluation for the second isogeny C on the image point $[l^7]G_1$ followed by a scalar multiplication [l] on the image point $[l^7]G_2$. A third isogeny $\phi_2$ can be then determined according to the third generator $[l^8]G_2$ of the third isogeny kernel on a third elliptic curve $E_2$. A fourth generator $[l^7]G_3$ of a fourth isogeny kernel can be determined by performing a point evaluation for the third isogeny $\phi_2$ on the image point $[l^7]G_2$. Here, $\phi_2([l^7]G_2) = [l^7]\phi_2(G_2) = [l^7]G_3$. A fourth isogeny $\phi_3$ can be then determined according to the fourth generator $[l^7]G_3$ of the fourth isogeny kernel on a fourth elliptic curve $E_3$.

In the example tree topology 700 shown in FIG. 7, a fifth generator $[l^6]G_4$ of a fifth isogeny kernel on a fifth elliptic curve $E_4$ is determined by determining the image point $[l^4]G_4$ on the same elliptic curve $E_4$. A series of point evaluations may be performed after obtaining the isogenies $\phi_0, \phi_1, \phi_2, \phi_3$ so as to compute the image point $[l^4]G_4$ on the fifth elliptic curve $E_4$ according to a point on the first elliptic curve $E_0$. In the example shown in FIG. 7, the image point $[l^4]G_0$ on the first elliptic curve $E_0$ is used to determine the image point $[l^4]G_4$ on the fifth elliptic curve $E_4$ by performing a series of point evaluations. Specifically, a point evaluation for the first isogeny $\phi_0$ is performed on the image point $[l^4]G_0$ on the first elliptic curve $E_0$ to obtain the image point $[l^4]G_1$ on the second elliptic curve $E_1$; a point evaluation for the second isogeny $\phi_1$ is performed on the image point $[l^4]G_1$ on the second elliptic curve $E_1$ to obtain the image point $[l^4]G_2$ on the third elliptic curve $E_2$; a point evaluation for the third isogeny $\phi_2$ is performed on the point $[l^4]G_2$ on the third elliptic curve $E_2$ to obtain the image point $[l^4]G_3$ on the fourth elliptic curve $E_3$; and a point evaluation for the fourth isogeny $\phi_3$ is performed on the image point $[l^4]G_3$ on the fourth elliptic curve $E_3$ to obtain the image point $[l^4]G_4$ on the fifth elliptic curve $E_4$. To further compute the fifth generator $[l^6]G_4$ of the fifth isogeny kernel, a scalar multiplication [l] is performed on the image point $[l^4]G_4$ 2 times. A fifth isogeny $\phi_4$ can be then determined according to the fifth generator $[l^6]G_4$ of the fifth isogeny kernel.

A sixth generator $[l^5]G_5$ of a sixth isogeny kernel on a sixth elliptic curve $E_5$ can be determined by performing a point evaluation for the fifth isogeny $\phi_4$ on the image point $[l^4]G_4$. Here, $\phi_4([l^4]G_4) = [l^4]\phi_4(G_4) = [l^4]G_5$ followed by a scalar multiplication [l] on the image point $[l^4]G_5$. The sixth isogeny $\phi_5$ can be then determined according to the sixth generator $[l^5]G_5$ of the sixth isogeny kernel. A point evaluation for the sixth isogeny $\phi_5$ is performed on the image point $[l^4]G_5$ on the sixth elliptic curve $E_5$ to obtain a seventh generator $[l^4]G_6$ of the seventh isogeny kernel. A seventh isogeny $\phi_6$ can be then determined according to the seventh generator $[l^4]G_6$ of the seventh isogeny kernel.

As discussed above in FIGS. 4 and 6, an eighth generator $[l^3]G_7$ of an eighth isogeny kernel can be determined after a series of point evaluations to obtain a point $G_7$ followed by a scalar multiplication [l] on the point $G_7$ 3 times. Alternatively, the eighth generator $[l^3]G_7$ of the eighth isogeny kernel can be determined using a "zigzag" path 720 as shown in FIG. 7. For example, as shown in FIG. 7, a point evaluation for the first isogeny co is performed on the generator $G_0$ followed by a scalar multiplication [l] on the image point $G_1$. A series of point evaluations for the isogenies $\phi_1, \phi_2, \phi_3, \phi_4, \phi_5$ is performed to determine the image point $[l]G_6$ on the seventh elliptic curve $E_6$ according to the image point $[l]G_1$ on the second elliptic curve $E_1$. The series of point evaluations for determining the image point $[l]G_6$ on the seventh elliptic curve $E_6$ is then followed by a scalar multiplication [l] on the image point $[l]G_6$ to determine the image point $[l^2]G_6$. A point evaluation for the seventh isogeny $\phi_6$ is performed on the image point $[l^2]G_6$ to obtain the image point $[l^2]G_7$ on the eighth elliptic curve $E_7$. The eighth generator $[l^3]G_7$ of the eighth isogeny kernel may be finally obtained by performing a scalar multiplication [l] on the image point $[l^2]G_7$. An eighth isogeny $\phi_7$ can be then determined according to the eighth generator $[l^3]G_7$ of the eighth isogeny kernel. A point evaluation for the eighth isogeny $\phi_7$ is performed on the image point $[l^2]G_7$ on the eighth elliptic curve $E_7$ to obtain a ninth generator $[l^2]G_8$ of a ninth isogeny kernel. A ninth isogeny $\phi_8$ can be then determined according to the eighth generator $[l^2]G_8$.

As shown in the example tree topology 700, the "zigzag" pathway 720 includes alternating cryptographic operations coupled by one or more corner points. In some implementations, a corner point is obtained through only one cryptographic operation on only one point and is only used to determine another point through a different cryptographic operation. For example, as shown in FIG. 7, there are three corner points in the zigzag path 720 for determining the eighth and ninth generators, e.g., a first corner point $[1]G_1$, a second corner point $[1]G_6$, and a third corner point $[1^2]G_6$. Specifically, the first corner point $[1]G_1$ is determined through a scalar multiplication on the image point $G_1$ and the first corner point $[1]G_1$ is used in a point evaluation to determine the image point $[1]G_2$; the second corner point $[1]G_6$ is determined through a point evaluation on the image point $[1]G_5$ and is used to determine the third corner point $[1^2]G_6$ through a scalar multiplication; and the third corner point $[1^2]G_6$ is determined through the scalar multiplication on the image point $[1]G_6$ and only used to determine the image point $[1^2]G_7$.

In some implementations, one type of cryptographic operation terminates at a corner point, which is not any one of the generators of any isogeny kernels. For example, the scalar multiplication to determine the first corner point $[1]G_1$ terminates at the first corner point $[1]G_1$. Similarly, the series of point evaluations to determine the second corner point $[1]G_6$ terminates at the second corner point $[1]G_6$, and the scalar multiplication to determine the third corner point $[1^2]G_6$ terminates at the third corner point $[1^2]G_6$.

In some implementations, a "zigzag" path may contain 3 corner points different from the corner points in the "zigzag" path 720 shown in FIG. 7, e.g., a first corner point $[1]G_2$, a second corner point $[1]G_3$, and a third corner point $[1^2]G_3$. In fact, a "zigzag" path in a tree topology may contain any number of corner points. For example, a "zigzag" path may contain only 1 corner point $[1^2]G_1$ which is determined by 2 scalar multiplications on the point $G_1$ and is only used to determine a point $[1^2]G_2$ using a point evaluation for the second isogeny $\phi_1$. For another example, a "zigzag" path may contain 2 corner points $[1]G_6$ and $[1^2]G_6$, in which the corner point $[1]G_6$ is determined through a series of point evaluations on the image point $[1]G_0$. In some implementations, the "zigzag" path allows the use of multiple scalar multiplication co-processors in parallel.

Finally, a tenth generator $[1]G_9$ is determined through a series of point evaluations for the isogenies $\phi_1, \phi_2, \phi_3, \phi_4, \phi_5, \phi_6, \phi_7, \phi_8$ to determine a point $G_9$ followed by a scalar multiplication $[1]$ on the image point $G_9$. A tenth isogeny $\phi_9$ can be then determined according to the tenth generator $[1]G_9$ of the tenth isogeny kernel. A point evaluation for the tenth isogeny $\phi_9$ is performed on the point $G_9$ on the tenth elliptic curve $E_9$ to obtain an eleventh generator $G_{10}$ of an eleventh isogeny kernel. An eleventh isogeny $\phi_{10}$ can be then determined according to the eleventh generator $[1]G_9$ of the eleventh isogeny kernel. In some implementations, after obtaining the eleventh isogeny $\phi_{11}$, the isogeny $\phi$ with a degree of $1^{11}$ may be determined using $\phi=\phi_{10}\circ\phi_9\circ\ldots\circ\phi_1\circ\phi_0$, in which the operation "$\circ$" represents composition.

In certain implementations, as shown in FIG. 7, it is not necessary to calculate each of the points, perform each scalar multiplication between two adjacent points, or point evaluation between adjacent points in the tree topology 700 in order to obtain the 11 generators of the isogeny kernels. For example, only 35 nodes out of 55 images points are computed through 12 scalar multiplications and 22 point evaluations; and 11 generators are computed through 6 scalar multiplications and 5 point evaluations.

In some implementations, a computer device, for example nodes 202A 202B as shown in FIG. 2, includes two point evaluation co-processors and two scalar multiplication co-processor. Two point evaluations in the tree topology 700 can be simultaneously performed in a batch by the two point evaluation co-processors. For example, the point evaluation for the first isogeny $\phi_0$ on the image point $[1^9]G_0$ and the point evaluation for the first isogeny $\phi_0$ on the image point $[1^7]G_0$ may be performed in a batch by the 2 point evaluation co-processors. For another example, the point evaluation for the first isogeny $\phi_0$ on the image point $[1^4]G_0$ and the point evaluation for the second isogeny $\phi_1$ on the image point $[1^7]G_1$ may be performed in a batch by the 2 point evaluation co-processors. For another example, the point evaluation for the second isogeny $\phi_1$ on the image point $[1^4]G_1$ and the point evaluation for the first isogeny $\phi_0$ on the generator $G_0$ may be performed in a batch by the 2 point evaluation co-processors, which may include the scalar multiplication on the image point $[V]G_2$ by the scalar multiplication co-processor.

In certain implementations, points evaluation operations for the same isogeny on points of the same elliptic curve are not required to be completed prior to exhausting the computational operations for determining the generators of the isogeny kernels. Some of the point evaluations can be delayed or combined with other point evaluations in later batches so as to efficiently accommodate limited computational resources (e.g., two point evaluation co-processors). For example, the point evaluation for the first isogeny $\phi_0$ on the point $[1^4]G_0$ and the point evaluation for the first isogeny $\phi_0$ on the point $G_0$ may be performed after the second generator $[1^9]G_1$ of the second isogeny kernel may be determined. For another example, the point evaluation for the third isogeny $\phi_2$ on the image point $[1]G_3$ is performed after the fourth generator $[1^7]G_3$ of the fourth isogeny kernel may be determined.

In some implementations, a batch may include a point evaluation for a first isogeny $\phi_j$ and a point evaluation for a second isogeny $\phi_k$, where j and k are integers and $|j-k|\geq 2$. For example, as shown in FIG. 7, a batch may include a first point evaluation for the fourth isogeny $\phi_3$ on the image point $[1^4]G_3$ by the first point evaluation co-processor and a second point evaluation for the second isogeny $\phi_1$ on the first corner point $[1]G_1$ by the second point evaluation co-processor. In this case, the first and second point evaluations in the batch have different domains and ranges. Specifically, the first point evaluation for the second isogeny $\phi_1$ has a first domain and a first range, while the second point evaluation for the fourth isogeny $\phi_3$ has a second domain and a second range. In this case, the first domain is the fourth elliptic curve $E_3$, the first range is the fifth elliptic curve $E_4$, the second domain is the second elliptic curve $E_1$ and the second range is the third elliptic curve $E_2$, in which the first domain, the second domain, the first range and the second range are all different, e.g., non-isomorphic elliptic curves.

In some implementations, a batch may include two scalar multiplications performed by two scalar multiplication co-processors. For example, the scalar multiplication to determine the first corner point $[1]G_1$ based on the image point $G_1$ can be performed in a batch with the scalar multiplication to determine the third generator $[1^8]G_2$ based on the image point $[1^7]G_2$.

In some implementations, point evaluations for the same isogeny on points on the same elliptic curve may be performed in separate batches. In some implementations, point evaluations for the same isogeny on points that are located closer to the generators of the isogeny kernels at the bottom of the tree topology have a higher priority over the point evaluations for the same isogeny on points that are located closer to the generator $G_0$ at the top of the tree topology (the root node of the tree topology). For example, the point evaluation for the first isogeny $\phi_0$ on the image point $[l^4]G_2$ may be performed by a point evaluation co-processor in a batch, while the point evaluation for the first isogeny $\phi_0$ on the image point $[l^7]G_0$ is performed by a point evaluation co-processor in an earlier batch. Using this method, computational operations for computing the generators of the isogeny kernels is prioritized over other cryptographic operations (e.g., point evaluations). Delaying certain point evaluations of the same isogeny to a later time (e.g., divide into separate batches) so that point evaluations for computing the generators of the isogeny kernels can be prioritized provides advantages such as, for example improved scheduling of computational resources for efficient parallel or multi-thread computing.

In some implementations, during the process of computing the generators of the isogeny kernels represented in the bottom row of the tree topology 700 as shown in FIG. 7, other cryptographic operations that are not defined in the tree topology can be also performed. For example, as discussed in FIG. 2, during the key generation step 212A, 212B, the nodes 202A, 202B may be required to perform point evaluations for each of the isogenies $\phi_i$ on the public parameters (P, Q R) of the other nodes. Specifically, the node 202A determines $\phi_{Ai}(P_B)$, $\phi_{Ai}(Q_B)$, and $\phi_{Ai}(R_B)$, wherein i is an integer and i=0, 1, . . . , 10; and the node 202B determines $\phi_{Bj}(P_A)$, $\phi_{Bj}(Q_A)$, and $\phi_{Bj}(R_A)$, wherein j is an integer and j=0, 1, . . . , m. In some implementations, these point evaluations depend on the availability of the isogenies $\phi_i$ which are calculated according to the tree topology 700. These point evaluations can be performed by the point evaluation co-processors when the isogenies $\phi_i$ become available by obtaining the corresponding generators of the isogeny kernels and also when the point evaluation co-processors are not occupied for other computational tasks defined in the tree topology 700. For example, point evaluations on the public parameters of the supersingular isogeny-based cryptosystem may be performed by additional point evaluation co-processors.

Figure 8:
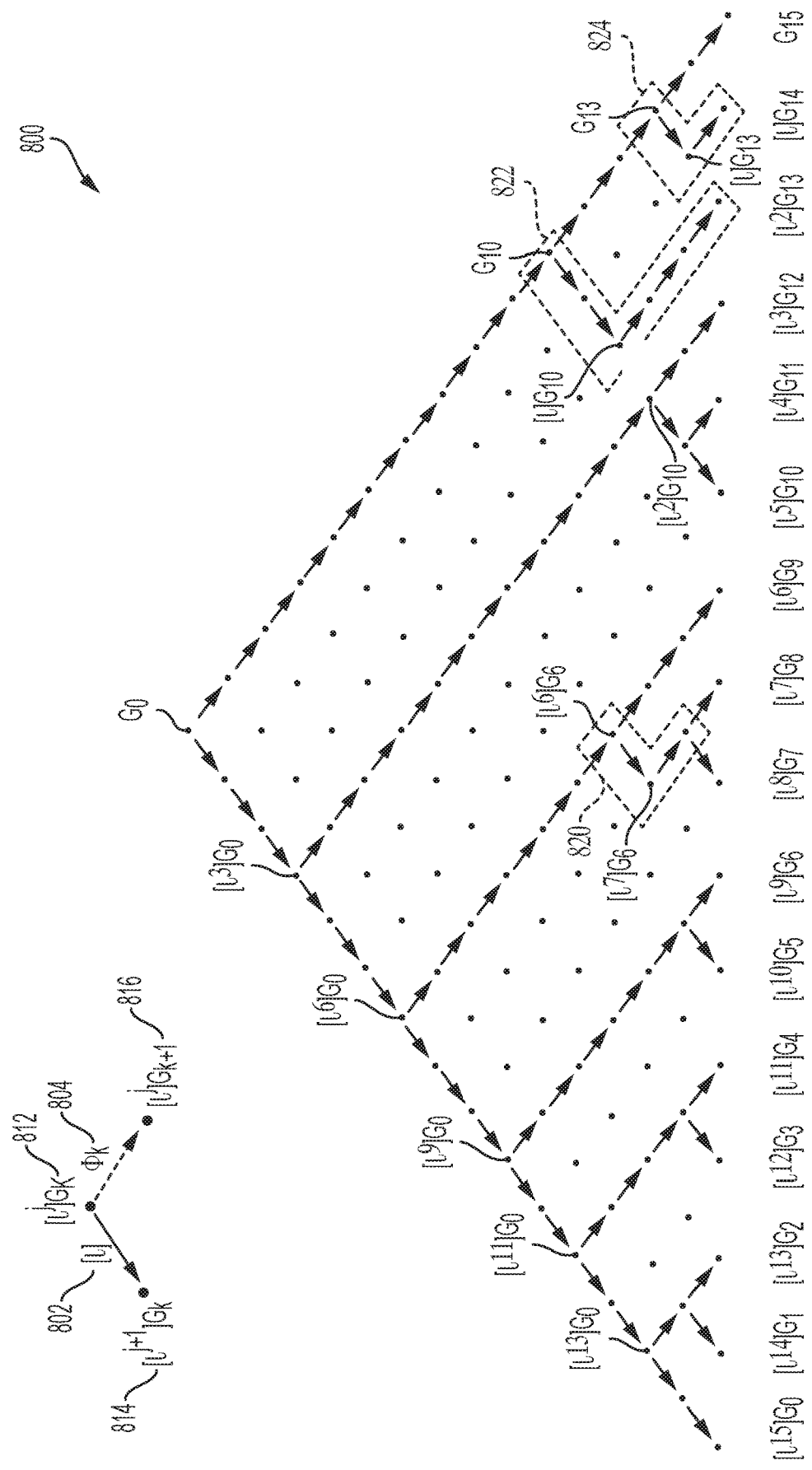
FIG. 8 is a schematic diagram showing an example tree topology with multiple zigzag paths for computing lower order isogeny kernels (order l) from a generator of an isogeny kernel having higher order ($l^n$).

FIG. 8 is a schematic diagram showing an example tree topology 800 with multiple zigzag paths for computing lower order isogeny kernels (order l) based on a generator ($G_0$) of an isogeny kernel having higher order ($l^n$). In the example shown in FIG. 8, n equals 16. The size (e.g., numbers of nodes and operations in the tree topology 800) is determined by the value of $l^n$; another value of n can be used.

In some implementations, the tree topology 800 defines operational steps and pathways to determine the values of the generators (e.g., $[l^{15}]G_0$, $[l^{14}]G_1$, . . . , $[l]G_{14}$, and $G_{15}$) for the lower order isogeny kernels represented in the bottom row of the tree topology 800. In some cryptographic protocols, the generators of the isogeny kernels may be used to determine isogenies of lower degrees (l). In certain implementations, the isogenies with lower degrees (e.g., $\phi_{15}$, $\phi_{14}$, . . . , $\phi_1$, $\phi_0$) may be used to apply or evaluate the isogeny $\phi$ (e.g., $\phi_A$ for node 202A and $\phi_B$ for node 202B) with a degree of $l^n$, for example, in the context generating the public key of a communication node (e.g., nodes 202A, 202B), verifying a public key received from a different communication node via a communication channel or other contexts.

In some implementations, the tree topology 800 is pre-configured by a program stored in a memory of a computer device and executed by a processor or cryptographic co-processors of the respective node. In some implementations, the tree topology 800 is used in various steps of a cryptographic protocol. For example, the same tree topology can be used in generating keys at 212A, 212B, and the same tree topology can be used in verifying a public key and derive shared secret at 214A, 214B. In some implementations, the tree topology 800 is shared between node 202A, 202B. In some other implementations, the tree topology 800 defined by $1_A{}^n$ (e.g., E[$2^n$]) is used by one node (e.g., 202A) and a different tree topology defined by $1_B{}^m$ (e.g., E[$3^m$]) is used by the other node (e.g., 202B).

The example tree topology 800 includes nodes connected by edges. The one hundred-and-thirty-six nodes in the tree topology 800 include a root node (which resides in the top level of the tree topology 800 and has no parent node), sixteen leaf nodes (which reside in the bottom level of the tree topology 800 and have no child nodes) and a hundred and nineteen intermediate nodes between the root node and the leaf nodes. The nodes in the tree topology correspond to generators of isogeny kernels. The nodes in higher levels of the tree correspond to generators of isogeny kernels of higher order. As such, the root node corresponds to a generator of an isogeny kernel ($G_0$) having the highest order (order $l^{16}$); the leaf nodes correspond to a plurality of generators (e.g., $[l^{16-i-1}]G_i$, i=0, . . . , 15) of isogeny kernels having the lowest order (order 1). The intermediate nodes correspond to generators of isogeny kernels having intermediate orders (order $l^i$, where i is an integer and $2 \leq i \leq 15$) associated with their respective levels in the tree. As shown in FIG. 8, the leaf nodes reside in the bottom level of the tree topology 800, at the end the diagonals. Nodes on the same diagonal are on the same elliptic curve corresponding to images points. For example, a first elliptic curve $E_0$ includes sixteen nodes $[l^{16-i}]G_0$, i=16, . . . , 1, including a first generator $[l^{15}]G_0$ of a first isogeny kernel. Similarly, a second elliptic curve $E_1$ includes fifteen nodes (e.g., $[l^{16-i-1}]G_1$, i=15, . . . , 1) including a second generator $[l^{14}]G_1$ of a second isogeny kernel; and generally, a k-th elliptic curve $E_k$ includes 16–k nodes (e.g., $[l^{16-i-k}]G_k$, i=15, . . . , 1) including one generator $[l^{16-k-1}]G_k$ of an isogeny kernel, in which k=0, 1, . . . , 15.

In the example, the tree topology 800 includes a plurality of edges representing a plurality of scalar multiplications 802 in a first direction and a plurality of point evaluations 804 in a second direction. Specifically, a scalar multiplication 802 in the first direction determines a first image point $[l^{j+1}]G_k$ 814 on an elliptic curve $E_k$ based on a second image point $[l^j]G_k$ 812 on the same elliptic curve $E_k$. A point evaluation 804 in the second direction for the isogeny $\phi_{15-k}$ on the second image point $[l^j]G_k$ 812 on the elliptic curve $E_k$ determines a third image point $[l^j]G_{k+1}$ 816 on an elliptic curve $E_{k+1}$. Here, j=16–k–i, k=0, 1, . . . , 15, and i= 16–k, . . . , 1.

In the example, determining the isogeny $\phi$ having a degree of $l^{16}$ may be decomposed into computations of 16 isogenies $\phi_k$ each having a degree of l. Here $\phi = \phi_{15}{}^\circ \phi_{14}{}^\circ \phi_{13} \ldots \phi_1{}^\circ \phi_0$, wherein each of the isogenies $\phi_k$ can be determined using their corresponding generators $[l^{15-k}]G_k$ of the isogeny kernels. Here, k=0, 1, . . . 15.

Specifically, a first generator $[l^{15}]G_0$ of a first isogeny kernel on a first elliptic curve $E_0$ can be obtained by performing a scalar multiplication [l] on the generator $G_0$ 15 times. A first isogeny $\phi_0$ can be then determined according to the first generator $[l^{15}]G_0$ of the first isogeny kernel. A second generator $[l^{14}]G_1$ of a second isogeny kernel on a second elliptic curve $E_1$ can be determined by performing a point evaluation for the first isogeny co on the image point $[l^{13}]G_0$ followed by a scalar multiplication [l] on the image point $[l^{13}]G_1$. Here, $\phi_0([l^{13}]G_0) = [l^{13}]l_0(G_0) = [l^{13}]G_1$. A second isogeny C can be then determined according to the second generator $[l^{14}]G_1$ of the second isogeny kernel. A third generator $[l^{13}]G_2$ of the third isogeny may be determined by performing a point evaluation for the second isogeny $\phi_0$ on the image point $[l^{13}]G_1$. A third isogeny $\phi_2$ can be then determined according to the third generator $[l^{13}]G_2$ of the third isogeny kernel.

A fourth generator $[l^{12}]G_3$ of a fourth isogeny kernel on a fourth elliptic curve $E_3$ can be determined by performing a series of point evaluations for the isogenies $\phi_0$, $\phi_1$, $\phi_2$ on the image point $[l^{11}]G_0$ followed by a scalar multiplication [l] on the image point $[l^{11}]G_3$. A fourth isogeny $\phi_3$ can be then determined according to the fourth generator $[l^{12}]G_3$ of the fourth isogeny kernel. A fifth generator $[l^{11}]G_4$ of the fifth isogeny kernel may be determined by performing a point evaluation for the fourth isogeny $\phi_3$ on the image point $[l^{11}]G_3$. A fifth isogeny $\phi_4$ can be then determined according to the fifth generator $[l^{11}]G_4$ of the fifth isogeny kernel.

A sixth generator $[l^{10}]G_5$ of a sixth isogeny kernel on a sixth elliptic curve $E_5$ can be determined by performing a series of point evaluations for the isogenies $\phi_0$, $\phi_1$, $\phi_2\phi_3$, $\phi_4$, on the image point $[l^9]G_0$ followed by a scalar multiplication [l] on the image point $[l^9]G_5$. The sixth isogeny $\phi_5$ can be then determined according to the sixth generator $[l^{10}]G_5$ of the sixth isogeny kernel. A seventh generator $[l^9]G_6$ of the seventh isogeny kernel may be determined by performing a point evaluation for the sixth isogeny $\phi_5$ on the image point $[l^9]G_5$. A seventh isogeny $\phi_6$ can be then determined according to the seventh generator $[l^9]G_6$ of the seventh isogeny kernel.

As discussed above in FIGS. 4 and 6, an eighth generator $[l^8]G_7$ of an eighth isogeny kernel on an eighth elliptic curve $E_7$ can be determined after obtaining a point on the same elliptic curve through a series of point evaluations which is followed by a series of scalar multiplications [l] on the point. Alternatively, the eighth generator $[l^8]G_7$ can be determined using a "zigzag" path 820 defined in the example tree topology 800 as shown in FIG. 8. A series of point evaluations may be performed after obtaining the isogenies $\phi_0$, $\phi_1$, $\phi_2$, $\phi_3$, $\phi_4$, $\phi_5$ so as to compute the image point $[l^6]G_6$ on the seventh elliptic curve $E_6$ according to the image point $[l^6]G_0$ on the first elliptic curve $E_0$. Specifically, a point evaluation for the first isogeny $\phi_0$ is performed on the image point $[l^6]G_0$ on the first elliptic curve $E_0$ to obtain the image point $[l^6]G_1$ on the second elliptic curve $E_1$; a point evaluation for the second isogeny $\phi_1$ is performed on the image point $[l^6]G_1$ on the second elliptic curve $E_1$ to obtain the image point $[l^6]G_2$ on the third elliptic curve $E_2$; a point evaluation for the third isogeny $\phi_2$ is performed on the image point $[l^6]G_2$ on the third elliptic curve $E_2$ to obtain the image point $[l^6]G_3$ on the fourth elliptic curve $E_3$; a point evaluation for the fourth isogeny $\phi_3$ is performed on the image point $[l^6]G_3$ on the fourth elliptic curve $E_3$ to obtain the image point $[l^6]G_4$ on the fifth elliptic curve $E_4$; a point evaluation for the fifth isogeny $\phi_4$ is performed on the image point $[l^6]G_4$ on the fifth elliptic curve $E_4$ to obtain the image point $[l^6]G_5$ on the sixth elliptic curve $E_5$; and a point evaluation for the sixth isogeny $\phi_5$ is performed on the image point $[l^6]G_5$ on the sixth elliptic curve $E_5$ to obtain the image point $[l^6]G_6$ on the seventh elliptic curve $E_6$. A scalar multiplication [l] is performed on the image point $[l^6]G_6$ to obtain the image point $[l^7]G_6$. To further compute the eighth generator $[l^8]G_7$ of the eighth isogeny kernel, a point evaluation for the seventh isogeny $\phi_6$ is performed on the image point $[l^7]G_6$ followed by a scalar multiplication on the image point $[l^7]G_7$. An eighth isogeny $\phi_7$ can be then determined according to the eighth generator $[l^8]G_7$ of the eighth isogeny kernel.

A ninth generator $[l^7]G_8$ of a ninth isogeny kernel may be determined by performing a point evaluation for the eighth isogeny $\phi_7$ on the point $[l^7]G_7$. A ninth isogeny $\phi_8$ can be then determined according to the ninth generator $[l^7]G_8$ of the ninth isogeny kernel. A tenth generator $[l^6]G_9$ of the tenth isogeny kernel on a tenth elliptic curve $E_9$ may be determined by a series of point evaluations for the isogenies $\phi_6$, $\phi_7$, $\phi_8$ on the image point $[l^6]G_6$. A tenth isogeny $\phi_9$ can be then determined according to the tenth generator $[l^6]G_9$ of the tenth isogeny kernel.

In the example tree topology 800 shown in FIG. 8, an eleventh generator $[l^5]G_{10}$ of the eleventh isogeny kernel on an eleventh elliptic curve $E_{10}$ is determined by determining one image point on the same elliptic curve $E_{10}$. A series of point evaluations may be performed after obtaining the isogenies $\phi_0$, $\phi_1$, $\phi_2$, $\phi_3$, $\phi_4$, $\phi_5$, $\phi_6$, $\phi_7$, $\phi_8$, $\phi_9$ so as to compute one point on the eleventh elliptic curve $E_{10}$ according to a point on the first elliptic curve $E_0$. In the example shown in FIG. 8, the point $[l^3]G_0$ on the first elliptic curve $E_0$ is used to determine the image point $[l^3]G_{10}$ on the eleventh elliptic curve $E_{11}$ by performing a series of point evaluations. To further compute the eleventh generator $[l^3]G_{10}$ of the eleventh isogeny kernel, a scalar multiplication [l] is performed on the image point $[l^3]G_{10}$ 2 times. An eleventh isogeny $\phi_{10}$ can be then determined according to the eleventh generator $[l^5]G_{10}$ of the eleventh isogeny kernel.

A twelfth generator $[l^4]G_{11}$ may be determined by performing a point evaluation for the eleventh isogeny $\phi_{10}$ on the image point $[l^4]G_{10}$. A twelfth isogeny $\phi_{11}$ can be then determined according to the twelfth generator $[l^4]G_{11}$ of the twelfth isogeny kernel. A thirteenth generator $[l^3]G_{12}$ of the thirteenth isogeny kernel on a thirteenth elliptic curve $E_{12}$ may be determined by a series of point evaluations for the isogenies $\phi_{10}$, $\phi_{11}$, on the image point $[l^3]G_{10}$. A thirteenth isogeny $\phi_{12}$ can be then determined according to the thirteenth generator $[l^3]G_{12}$ of the thirteenth isogeny kernel.

As discussed above in FIGS. 4 and 6, a fourteenth generator $[l^2]G_{13}$ of the fourteenth isogeny kernel on an fourteenth elliptic curve $E_B$ can be determined after obtaining a point on the same elliptic curve through a series of point evaluations which is followed by a series of scalar multiplications [l] on the image point. For example, a series of point evaluations may be performed on the generator $G_0$ to determine the image point $G_{13}$, followed by a scalar multiplication on the image point $G_{13}$ 2 times. Alternatively, the fourteenth generator $[l^2]G_{13}$ of the fourteenth isogeny kernel can be determined using a "zigzag" path 822 as shown in FIG. 8. A series of point evaluations for the isogenies $\phi_0$, $\phi_1$, $\phi_2$, $\phi_3$, $\phi_4$, $\phi_5$, $\phi_6$, $\phi_7$, $\phi_8$, $\phi_9$ is performed on the generator $G_0$ on the first elliptic curve $E_0$ to determine the image point $G_{10}$ on the eleventh elliptic curve $E_{10}$. A scalar multiplication [l] is performed on the image point $G_{10}$ 2 times to obtain a corner point $[l^2]G_{10}$. A series of point evaluations for the isogenies $\phi_{10}$, $\phi_{11}$, $\phi_{12}$ on the corner point $[l^2]G_{10}$ is performed to obtain the fourteenth generator $[l^2]G_{13}$ of the fourteenth isogeny kernel. A fourteenth isogeny $\phi_{13}$ can be then determined according to the fourteenth generator $[l^2]G_{13}$ of the fourteenth isogeny kernel.

A series of point evaluations for the isogenies $\phi_{10}$, $\phi_{11}$, $\phi_{12}$ on the image point $G_{10}$ is further performed to obtain the point $G_{13}$ on the fourteenth elliptic curve $E_{13}$. A scalar multiplication [l] is performed on the point $G_{13}$ to obtain a corner point $[l]G_{13}$. A point evaluation for the isogeny $\phi_{13}$ is performed on the corner point $[l]G_{13}$ to obtain a fifteenth generator $[1]G_{14}$ of the fifteenth isogeny kernel. A fifteenth isogeny $\phi_{14}$ can be then determined according to the fifteenth generator $[1]G_{14}$ of the fifteenth isogeny kernel.

A series of point evaluations for the isogenies $\phi_{13}$, $\phi_{14}$ on the point $G_{13}$ is performed to obtain a sixteenth generator $G_{15}$ of the sixteenth isogeny kernel. A sixteenth isogeny $\phi_{15}$ can be then determined according to the sixteenth generator $G_{15}$ of the sixteenth isogeny kernel.

In some implementations, a tree topology may include a plurality of "zigzag" paths, each of which may contain at least one corner point. For example, the example tree topology includes 3 "zigzag" paths 820, 822, 824. Each of the three "zigzag" pathways in the tree topology 800 shown in FIG. 8 contains 1 corner point, e.g., a first corner point $[1^7]G_6$ in the first "zigzag" path 820, a second corner point $[1^2]G_{10}$ in the second "zigzag" path 822, and a third corner point $[1]G_B$ in the third "zigzag" path 826. A tree topology may contain any number of "zigzag" paths; each of the "zigzag" paths may contain any number of corner points; and each of the corner points may be any nodes in the tree topology 800.

In some implementations, one type of cryptographic operation terminates at a corner point, which is not any one of the generators of any isogeny kernels. For example, the scalar multiplication to determine the first corner point $[1^7]G_6$ terminates at the first corner point $[1^7]G_6$. Similarly, the series of point evaluations to determine the second corner point $[1^3]G_{10}$ terminates at the second corner point $[1^3]G_{10}$, and the scalar multiplication to determine the third corner point $[1]G_B$ terminates at the third corner point $[1]G_B$.

In certain implementations, as shown in FIG. 8, it is not necessary to calculate each of the nodes, perform each scalar multiplication between two adjacent points, or each point evaluation between adjacent points in the tree topology 800 in order to obtain the 16 generators. For example, only 65 intermediate nodes out of 120 images points are computed through 19 scalar multiplications and 44 point evaluations; and 16-generators are computed through 6 scalar multiplications and 10 point evaluations. Referring back to the tree topology 600 shown in FIG. 6, the tree topology 800 has more cryptographic operation steps than the tree topology 600. In some implementations, the "zigzag" paths allow the use of multiple scalar multiplication co-processors in parallel.

In some implementations, a node, for example nodes 202A 202B as shown in FIG. 2, includes three point evaluation co-processors and two scalar multiplication co-processor. Three point evaluations in the tree topology 800 can be simultaneously performed in a batch by the 3 point evaluation co-processors. For example, the point evaluations for the first isogeny $\phi_0$ on the nodes $[1^{13}]G_0$, $[1^{11}]G_0$, $[1^9]G_0$ are performed in a batch. For another example, the point evaluations for the first isogeny $\phi_1$ on the nodes $[1^{13}]G_1$, $[1^{11}]G_1$, $[1^9]G_1$ are performed in a batch. For another example, the point evaluations the first isogeny $\phi_0$ on the nodes $[1^6]G_0$, $[1^3]G_0$, $[1]G_0$ are performed in a batch, which may also include the scalar multiplication on the image point $[1^{13}]G_1$ by the scalar multiplication co-processor.

In certain implementations, point evaluation operations for the same isogeny on points of the same elliptic curve are not required to be completed prior to exhausting the computational operations for determining the generators of the isogeny kernels. Some of the point evaluations can be delayed or combined with other point evaluations in later batches so as to efficiently accommodate limited computational resources (e.g., three point evaluation co-processors). For example, the point evaluations for the second isogeny $\phi_1$ on the nodes $[1^3]G_1$ and $G_1$ are performed after the third generator $[1^{13}]G_2$ of the third isogeny kernel is determined. For another example, the point evaluations for the fourth isogeny $\phi_3$ on the nodes $[1^3]G_3$ and $G_3$ are performed after the fifth generator $[1^{11}]G_4$ of the fifth isogeny kernel is determined.

In some implementations, a batch may include a point evaluation for a first isogeny $\phi_j$ and a point evaluation for a second isogeny $\phi_k$, where j and k are integers and $|j-k| \geq 2$. For example, as shown in FIG. 8, a batch may include a first point evaluation for the third isogeny $\phi_2$ on the point $G_2$ by the first point evaluation co-processor, a second point evaluation for the fourth isogeny $\phi_3$ on the image point $[1^3]G_3$ by the second point evaluation co-processor, and a third point evaluation for the sixth isogeny $\phi_5$ on the image point $[1^6]G_5$ by the third point evaluation co-processor. In this case, the second and third point evaluations in the batch have different domains and ranges. Specifically, the second point evaluation for the fourth isogeny $\phi_3$ has a first domain and a first range, while the third point evaluation for the sixth isogeny $\phi_5$ has a second domain and a second range. In this case, the first domain is the fourth elliptic curve $E_3$, the first range is the fifth elliptic curve $E_4$, the second domain is the sixth elliptic curve $E_5$ and the second range is the seventh elliptic curve $E_6$, in which the first domain, the second domain, the first range and the second range are all different, e.g., non-isomorphic elliptic curves.

In some implementations, a batch may include 2 scalar multiplications performed by 2 scalar multiplication co-processors. For example, the scalar multiplication on the image point $G_{10}$ to determine the image point $[1]G_{10}$ performed by a first scalar multiplication co-processor can be in the same batch with the scalar multiplication on the image point $[1^3]G_{10}$ to determine the image point $[1^4]G_{10}$ performed by a second scalar multiplication co-processor. For another example, the scalar multiplication on the image point $[1]G_{10}$ to determine the image point $[1^2]G_{10}$ performed by the first scalar multiplication co-processor can be in the same batch with the scalar multiplication on the image point $[1^4]G_{10}$ to determine the eleventh generator $[1^5]G_{10}$ of the eleventh isogeny kernel performed by the second scalar multiplication co-processor.

In some implementations, point evaluations for the same isogeny on points on the same elliptic curve may be performed in separate batches. In some implementations, point evaluations for the same isogeny on points that are located closer to the generators of the isogeny kernels at the bottom of the tree topology have a higher priority over the point evaluations for the same isogeny on points that are located closer to the point $G_0$ at the top of the tree topology. Using this method, computational operations for computing the generators of the isogeny kernels is prioritized over other cryptographic operations (e.g., point evaluations). Delaying certain point evaluations of the same isogeny to a later time (e.g., divide into separate batches) so that point evaluations for computing the generators of the isogeny kernels can be prioritized provides advantages such as, for example improved scheduling of computational resources for efficient parallel or multi-thread computing.

In some implementations, during the process of computing the generators of the isogeny kernels represented in the bottom row of the tree topology 800 as shown in FIG. 8, other cryptographic operations that are not defined in the tree topology can be also performed. For example, as discussed in FIG. 2, during the key generation step 212A, 212B, the nodes 202A, 202B may be required to perform point evaluations for each of the isogenies $\phi_i$ on the public parameters (P, Q R) of the other nodes. Specifically, the node 202A determines $\phi_{Ai}(P_B)$, $\phi_{Ai}(Q_B)$, and $\phi_{Ai}(R_B)$, wherein i is an integer and i=0, 1, . . . , 15; and the node 202B determines $\phi_{Bj}(P_A)$, $\phi_{Bj}(Q_A)$, and $\phi_{Bj}(R_A)$, wherein j is an integer and j=0, 1, . . . , m. In some implementations, these point evaluations depend on the availability of the isogenies $\phi_i$ which are calculated according to the tree topology 800. These point evaluations can be performed by the point evaluation co-processors when the isogenies $\phi_i$ become available by obtaining the corresponding generators of the isogeny kernels and also when the point evaluation co-processors are not occupied for other computational tasks defined in the tree topology 800. For example, point evaluations on the public parameter of the supersingular isogeny-based cryptosystem may be performed by additional point evaluation co-processors.

In some implementations, after obtaining the sixteenth isogeny $\phi_{15}$, the isogeny $\phi$ with a degree of $l^{16}$ may be determined using $\phi=\phi_{15}\circ\phi_{14}\circ \ldots \circ\phi_1\circ\phi_0$, in which the operation "$\circ$" represents composition.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, e.g., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network including a satellite link, and peer-to-peer networks (e.g., ad hoc peer-to-peer networks). A relationship of client and server may arise by virtue of computer programs running on the respective computers and having a client-server relationship to each other.

In a general aspect of what is described above, a supersingular isogeny-based cryptography process is performed.

In a first example, a cryptographic element is generated by executing a supersingular isogeny-based cryptography protocol. Executing the supersingular isogeny-based cryptography protocol includes computing a generator of a first isogeny kernel and traversing a tree topology. The tree topology includes nodes and edges coupling the nodes.

The edges of the tree topology include a first set of edges representing scalar multiplications and a second set of edges representing point evaluations. A plurality of isogeny kernels, which correspond to respective nodes (e.g., leaf nodes or another subset of nodes) in the tree topology and have a lower order than the first isogeny kernel, are computed using a plurality of cryptographic co-processors (e.g., point evaluation co-processors 304, scalar multiplication co-processors 306, and image curve evaluation co-processors 308 as shown in FIG. 3). Using the plurality of cryptographic co-processors includes using a plurality of scalar multiplication co-processors to execute batches of operations. At least one of the batches includes two or more of the scalar multiplications. The cryptographic element can then be used to execute cryptographic correspondence between the first entity and a second entity (e.g., between "Alice" and "Bob" as shown in FIG. 2). The cryptographic correspondence includes communication over a communication channel between computer devices (e.g., as shown in FIG. 1).

Implementations of the first example may include one or more of the following features. The lower order of each of the plurality of isogeny kernels may be 2, 3, or 4. Computing the generator of the first isogeny kernel further includes computing a coordinate of the generator. Using the plurality of cryptographic co-processors includes using a plurality of scalar multiplication co-processors and a plurality of point evaluation co-processors to execute the batches. At least one of the batches includes two or more of the scalar multiplications represented in the tree topology and two or more point evaluations. At least one of the batches includes two or more of the point evaluations represented in the tree topology, e.g., a point evaluation for the isogeny $\phi_0$ on the points $[l^2]G_0$ by a first point evaluation co-processor and a point evaluation for the isogeny $\phi_0$ on the point $[l^4]G_0$ by a second point evaluation co-processor as shown in FIG. 4. At least one of the batches includes a point evaluation of a public parameter of a supersingular isogeny-based cryptosystem. The point evaluation of the public parameter is not represented in the tree topology. At least one of the batches includes a first point evaluation represented in the tree topology for the first isogeny $\phi_0$ on the point $G_0$ by the first point evaluation co-processor has a first domain $E_0$ and a first range $E_1$, and a second point evaluation represented in the tree topology for the third isogeny $\phi_2$ on the point $[l^2]G_2$ by the second point evaluation co-processor has a second domain $E_2$ and a second range $E_3$. The first domain, the first range, the second domain and the second range are non-isomorphic elliptic curves. The cryptography protocol corresponds to a supersingular isogeny key exchange (SIKE) or a supersingular isogeny Diffie-Hellman (SIDH) protocol.

In a second example, a computing system includes one or more processors, a plurality of cryptographic co-processors and a computer-readable medium storing instructions that are operable when executed by the one or more processors to perform one or more operations of the first example.

In a third example, a non-transitory computer-readable medium stores instructions that are operable when executed by data processing apparatus to perform operations of the first example.

In a fourth example, a cryptographic element is generated by executing a supersingular isogeny-based cryptography protocol. Executing the supersingular isogeny-based cryptography protocol includes computing a generator of a first isogeny kernel and traversing a tree topology. The tree topology includes nodes and edges between the nodes. The edges of the tree topology include a first set of edges representing scalar multiplications and a second set of edges representing point evaluations. A plurality of isogeny kernels, which correspond to respective nodes (e.g., leaf nodes or another subset of nodes) in the tree topology and have a lower order than the first isogeny kernel, are computed by traversing a zigzag path through the tree topology. The zigzag path includes a series of one or more operations (e.g., a series of scalar multiplications, a series of point evaluations) that terminates at a node above the leaf nodes in the tree topology. The cryptographic element can then be used to execute cryptographic correspondence between the first entity and a second entity (e.g., between "Alice" and "Bob" as shown in FIG. 2). The cryptographic correspondence includes communication over a communication channel between computer devices (e.g., as shown in FIG. 1).

Implementations of the fourth example may include one or more of the following features. The lower order of each of the plurality of isogeny kernels may be 2, 3, or 4. Computing the generator of the first isogeny kernel further includes computing a coordinate of the generator. The zigzag path can further include a series of one or more point evaluations after the series of one or more scalar multiplications. The series of one or more point evaluations may terminate at a node above the respective leaf nodes in the tree topology. The cryptography protocol corresponds to a supersingular isogeny key exchange (SIKE) or a supersingular isogeny Diffie-Hellman (SIDH) protocol. The cryptographic element is a public key of the first entity (e.g., "Alice" as shown in FIG. 2), a shared secret or a public key of the second entity (e.g., "Bob" as shown in FIG. 2). The plurality of isogeny kernels is computed using a plurality of cryptographic co-processors to execute batches of operations. The plurality of cryptographic co-processors may include at least one scalar multiplication co-processor and at least one point evaluation co-processor. At least one of the batches includes a point evaluation of a public parameter of a supersingular isogeny-based cryptosystem, which is not represented in the tree topology.

In a fifth example, a computing system includes one or more processors and a computer-readable medium storing instructions that are operable when executed by the one or more processors to perform one or more operations of the fourth example.

In a sixth example, a non-transitory computer-readable medium stores instructions that are operable when executed by data processing apparatus to perform operations of the fourth example.

In a seventh example, a cryptographic element is generated by executing a supersingular isogeny-based cryptography protocol. Executing the supersingular isogeny-based cryptography protocol includes computing a generator of a first isogeny kernel and traversing a tree topology. The tree topology includes nodes and edges between the nodes. The edges of the tree topology include a first subset of edges representing scalar multiplications and a second subset of edges representing point evaluations. A plurality of isogeny kernels, which correspond to respective nodes (e.g., leaf nodes or another subset of nodes) in the tree topology and have a lower order than the first isogeny kernel, are computed by executing batches of operations. At least one of the batches includes a first point evaluation that is represented in the tree topology (e.g., an isogeny $\phi_0$ applied to a point $G_0$) and has a first domain (e.g., $E_0$) and a first range (e.g., $E_1$), and a second point evaluation that is represented in the tree topology (e.g., an isogeny $\phi_2$ applied to a point $[l^2]G_2$) as a second domain (e.g., $E_2$) and a second range (e.g., $E_3$). The first domain, the first range, the second domain and the second range are non-isomorphic elliptic curves. The cryptographic element can then be used to execute cryptographic correspondence between the first entity and a second entity (e.g., between "Alice" and "Bob" as shown in FIG. 2). The cryptographic correspondence includes communication over a communication channel between computer devices (e.g., as shown in FIG. 1).

Implementations of the seventh example may include one or more of the following features. The lower order of each of the plurality of isogeny kernels may be 2, 3, or 4. Computing the generator of the first isogeny kernel further includes computing a coordinate of the generator. The cryptography protocol may correspond to a supersingular isogeny key exchange (SIKE) or a supersingular isogeny Diffie-Hellman (SIDH) protocol. The cryptographic element is a public key of the first entity (e.g., "Alice" as shown in FIG. 2), a shared secret or a public key of the second entity (e.g., "Bob" as shown in FIG. 2). The cryptographic element is used to verify the public key of the first entity. At least one of the batches includes a plurality of the point evaluations represented in the tree topology and at least one of the scalar multiplications represented in the tree topology. The plurality of isogeny kernels is computed using a plurality of cryptographic co-processors to execute the batches of operations. The plurality of cryptographic co-processors includes at least one scalar multiplication co-processor and a plurality of point evaluation co-processors. At least one of the batches may include a point evaluation of a public parameter of a supersingular isogeny-based cryptosystem. The point evaluation of the public parameter is not represented in the tree topology. The supersingular isogeny-based cryptographic protocol may further include using the plurality of isogeny kernels to generate or verify the cryptographic element (e.g., as shown in FIG. 2).

In an eighth example, a computing system includes one or more processors and a computer-readable medium storing instructions that are operable when executed by the one or more processors to perform one or more operations of the seventh example.

In a ninth example, a non-transitory computer-readable medium stores instructions that are operable when executed by data processing apparatus to perform operations of the seventh example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A supersingular isogeny-based cryptography method comprising:
   generating a cryptographic element by executing a supersingular isogeny-based cryptography protocol, wherein executing the supersingular isogeny-based cryptography protocol comprises:
   computing a generator of a first isogeny kernel; and
   traversing a pre-determined tree topology comprising nodes connected by edges, a first subset of the edges representing scalar multiplications, a second subset of the edges representing point evaluations,
   wherein traversing the pre-determined tree topology comprises using a plurality of cryptographic co-processors to compute a plurality of isogeny kernels based on the generator of the first isogeny kernel, each of the plurality of isogeny kernels corresponding to a respective node in the tree topology and having a lower order than the first isogeny kernel, and
   wherein using the plurality of cryptographic co-processors comprises using a plurality of scalar multiplication co-processors to execute batches of operations, at least one of the batches comprising two or more of the scalar multiplications,
   wherein at least one of the batches comprises:
      a first point evaluation represented in the tree topology and having a first domain and a first range, and
      a second point evaluation represented in the tree topology and having a second domain and a second range,
      wherein the first domain, the first range, the second domain and the second range are non-isomorphic elliptic curves; and
   using the cryptographic element to execute cryptographic correspondence between a first entity and a second entity, wherein the cryptographic correspondence includes communication over a communication channel between computer devices.

2. The method of claim 1, wherein the lower order is one of 2, 3, or 4.

3. The method of claim 1, wherein computing the generator of the first isogeny kernel comprises computing a coordinate of the generator.

4. The method of claim 1, wherein using the plurality of cryptographic co-processors comprises using a plurality of scalar multiplication co-processors and a plurality of point evaluation co-processors to execute the batches, and at least one of the batches comprises two or more of the scalar multiplications represented in the tree topology and two or more point evaluations.

5. The method of claim 4, wherein at least one of the batches comprises two or more of the point evaluations represented in the tree topology.

6. The method of claim 5, wherein at least one of the batches comprises a point evaluation of a public parameter of a supersingular isogeny-based cryptosystem, which is not represented in the tree topology.

7. The method of claim 1, wherein the cryptography protocol corresponds to a supersingular isogeny key exchange (SIKE) protocol or a supersingular isogeny Diffie-Hellman (SIDH) protocol.

8. The method of claim 7, wherein executing the cryptography protocol comprises at least one of: generating a public key of the first entity, generating a shared secret or verifying a public key of the second entity.

9. The method of claim 1, wherein computing at least one of the plurality of isogeny kernels comprises traversing a zigzag path through the tree topology.

10. A computer system comprising:
one or more processors;
a plurality of cryptographic co-processors; and
memory storing instructions that, when executed, cause the one or more processors to perform operations comprising:
generating a cryptographic element by executing a supersingular isogeny-based cryptography protocol, wherein executing the supersingular isogeny-based cryptography protocol comprises:
computing a generator of a first isogeny kernel;
traversing a pre-determined tree topology comprising nodes connected by edges, a first subset of the edges representing scalar multiplications, a second subset of the edges representing point evaluations,
wherein traversing the pre-determined tree topology comprises using the plurality of cryptographic co-processors to compute a plurality of isogeny kernels based on the generator of the first isogeny kernel, each of the plurality of isogeny kernels corresponding to a respective node in the tree topology and having a lower order than the first isogeny kernel, and
wherein using the plurality of cryptographic co-processors comprises using a plurality of scalar multiplication co-processors to execute batches of operations, each of the batches comprising two or more of the scalar multiplications,
wherein at least one of the batches comprises:
a first point evaluation represented in the tree topology and having a first domain and a first range, and
a second point evaluation represented in the tree topology and having a second domain and a second range,
wherein the first domain, the first range, the second domain and the second range are non-isomorphic elliptic curves; and
using the cryptographic element to execute cryptographic correspondence between a first entity and a second entity, wherein the cryptographic correspondence includes communication over a communication channel between the computer system and another computer device.

11. The computer system of claim 10, wherein the lower order is one of 2, 3, or 4.

12. The computer system of claim 10, wherein computing the generator of the first isogeny kernel comprises computing a coordinate of the generator.

13. The computer system of claim 10, wherein using the plurality of cryptographic co-processors comprises using a plurality of scalar multiplication co-processors and a plurality of point evaluation co-processors to execute the batches, and at least one of the batches comprises two or more of the scalar multiplications represented in the tree and two or more point evaluations.

14. The computer system of claim 13, wherein at least one of the batches comprises two or more of the point evaluations represented in the tree topology.

15. The computer system of claim 14, wherein at least one of the batches comprises a point evaluation of a public parameter of a supersingular isogeny-based cryptosystem, which is not represented in the tree topology.

16. The computer system of claim 10, wherein the cryptography protocol corresponds to a supersingular isogeny key exchange (SIKE) protocol or a supersingular isogeny Diffie-Hellman (SIDH) protocol.

17. The computer system of claim 16, wherein executing the cryptography protocol comprises at least one of: generating a public key of the first entity, generating a shared secret or verifying a public key of the second entity.

18. The computer system of claim 10, wherein computing at least one of the plurality of isogeny kernels comprises traversing a zigzag path through the tree topology.

19. A non-transitory computer-readable medium storing instructions that are operable when executed by data processing apparatus to perform operations comprising:
generating a cryptographic element by executing a supersingular isogeny-based cryptography protocol, wherein executing the supersingular isogeny-based cryptography protocol comprises:
computing a generator of a first isogeny kernel; and
traversing a pre-determined tree topology comprising nodes connected by edges, a first subset of the edges representing scalar multiplications, a second subset of the edges representing point evaluations,
wherein traversing the pre-determined tree topology comprises using a plurality of cryptographic co-processors to compute a plurality of isogeny kernels based on the generator of the first isogeny kernel, each of the plurality of isogeny kernels corresponding to a respective node in the tree topology and having a lower order than the first isogeny kernel, and
wherein using the plurality of cryptographic co-processors comprises using a plurality of scalar multiplication co-processors to execute batches of operations, each of the batches comprising two or more of the scalar multiplications,
wherein at least one of the batches comprises:
a first point evaluation represented in the tree topology and having a first domain and a first range, and
a second point evaluation represented in the tree topology and having a second domain and a second range, wherein the first domain, the first range, the second domain and the second range are non-isomorphic elliptic curves; and using the cryptographic element to execute cryptographic correspondence between a first entity and a second entity, wherein the cryptographic correspondence includes communication over a communication channel between computer devices.

20. The non-transitory computer-readable medium of claim 19, wherein the lower order is one of 2, 3, or 4.

21. The non-transitory computer-readable medium of claim 19, wherein computing the generator of the first isogeny kernel comprises computing a coordinate of the generator.

22. The non-transitory computer-readable medium of claim 19, wherein using the plurality of cryptographic co-processors comprises using a plurality of scalar multiplication co-processors and a plurality of point evaluation co-processors to execute the batches, and at least one of the batches comprises two or more of the scalar multiplications represented in the tree and two or more point evaluations.

23. The non-transitory computer-readable medium of claim 22, wherein at least one of the batches comprises two or more of the point evaluations represented in the tree topology.

24. The non-transitory computer-readable medium of claim 23, wherein at least one of the batches comprises a point evaluation of a public parameter of a supersingular isogeny-based cryptosystem, which is not represented in the tree topology.

25. The non-transitory computer-readable medium of claim 19, wherein the cryptography protocol corresponds to a supersingular isogeny key exchange (SIKE) protocol or a supersingular isogeny Diffie-Hellman (SIDH) protocol.

26. The non-transitory computer-readable medium of claim 25, wherein executing the cryptography protocol comprises at least one of: generating a public key of the first entity, generating a shared secret or verifying a public key of the second entity.

27. The non-transitory computer-readable medium of claim 19, wherein computing at least one of the plurality of isogeny kernels comprises traversing a zigzag path through the tree topology.

* * * * *

UNITED STATES PATENT AND TRADEMARK OFFICE
CERTIFICATE OF CORRECTION

PATENT NO. : 10,812,265 B1  
APPLICATION NO. : 16/863733  
DATED : October 20, 2020  
INVENTOR(S) : Victoria de Quehen and Shane Daniel Kelly Page 1 of 3

It is certified that error appears in the above-identified patent and that said Letters Patent is hereby corrected as shown below:

Column 8, Line 36, Delete "a" and insert -- $\alpha$ -- therefor.

Column 8, Line 40, Delete "$G_B = P_B [\beta]Q_B$" and insert -- $G_B = P_B + [\beta]Q_B$ -- therefor.

Column 8, Line 47, Delete "p" and insert -- $\beta$ -- therefor.

Column 11, Line 60, Delete "in in" and insert -- in -- therefor.

Column 13, Line 43, Delete "processors" and insert -- co-processors -- therefor.

Column 13, Line 44, Delete "processors" and insert -- co-processors -- therefor.

Column 13, Line 55, Delete "$[l^1]G_4$," and insert -- $[l]G_4$, -- therefor.

Column 14, Line 38, After "$([l^5]G_0$,", insert -- $[l^4]G_1$, -- therefor.

Column 15, Line 8, Delete "$\Phi_5°\Phi_4°\Phi_2°\Phi_1°\Phi_0$," and insert -- $\Phi_5°\Phi_4°\Phi_3°\Phi_2°\Phi_1°\Phi_0$, -- therefor.

Column 16, Line 66, Delete "$\Phi_j$" and insert -- $\Phi_i$ -- therefor.

Column 17, Line 2, Delete "$\Phi_j$" and insert -- $\Phi_i$ -- therefor.

Column 17, Line 36, Delete "202A 202B," and insert -- 202A, 202B, -- therefor.

Column 17, Line 56, Delete "a" and insert -- $\alpha$ -- therefor.

Column 17, Line 64, Delete "304" and insert -- 306 -- therefor.

Column 19, Line 38, Delete "$\Phi_j$" and insert -- $\Phi_i$ -- therefor.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,812,265 B1

Column 19, Line 45, Delete "$\Phi_j$" and insert -- $\Phi_i$ -- therefor.

Column 19, Line 47, Delete "$\Phi_j$" and insert -- $\Phi_i$ -- therefor.

Column 19, Line 57, Delete "$\Phi=\Phi_{n-1}\circ\Phi_{n-2}\circ\Phi_1\circ\Phi_0,$" and insert -- $\Phi = \Phi_{n-1}\circ\Phi_{n-2}\circ ... \circ\Phi_1\circ\Phi_0,$ -- therefor.

Column 20, Line 9, Delete "$\Phi_{14}, ..., \Phi_{14}, ..., \Phi_1, \Phi_0)$" and insert -- $\Phi_{14}, ..., \Phi_1, \Phi_0)$ -- therefor.

Column 20, Line 55, Delete "E," and insert -- $E_1$ -- therefor.

Column 21, Line 4, Delete "j=16 k-i," and insert -- j = 16 - k - i, -- therefor.

Column 21, Line 64, Delete "$[1^1]G_5$" and insert -- $[1^{10}]G_5$ -- therefor.

Column 21, Line 67, Delete "$\Phi_4([1^{10}]G_4)=[1_{10}]\Phi_4(G_4)=[1^{10}]G_5.$" and insert -- $\Phi_4([1^{10}]G_4) = [1^{10}]\Phi_4(G_4) = [1^{10}]G_5.$ -- therefor.

Column 22, Line 28, Delete "1"" and insert -- $1^n$ -- therefor.

Column 22, Line 44, Delete "202A 202B" and insert -- 202A, 202B -- therefor.

Column 23, Line 65, Delete "(P, Q R)" and insert -- (P, Q, R) -- therefor.

Column 24, Line 3, Delete "$\Phi_j$" and insert -- $\Phi_i$ -- therefor.

Column 24, Line 6, Delete "$\Phi_j$" and insert -- $\Phi_i$ -- therefor.

Column 24, Line 37, Delete "$\Phi_0$" and insert -- $\Phi$ -- therefor.

Column 25, Line 16, Delete "$[1^{10-i]G}{}_0,$" and insert -- $[1^{10-i}] |G_0,$ -- therefor.

Column 25, Line 39, Delete "$[1^{10-k]G}{}_k$" and insert -- $[1^{10-k}]G_k$ -- therefor.

Column 25, Line 55, Delete "C" and insert -- $\Phi_1$ -- therefor.

Column 27, Line 66, Delete "202A 202B" and insert -- 202A, 202B -- therefor.

Column 28, Line 16, delete "$[V]G_2$" and insert -- $[1^7]G_2$ -- therefor.

Column 29, Line 24, delete "(P, Q R)" and insert -- (P, Q, R) -- therefor.

Column 30, Line 65, delete "co" and insert -- $\Phi_0$ -- therefor.

Column 30, Line 67, delete "$\Phi_0([1^{13}]G_0)=[1^{13}]1_0(G_0)=[1^{13}]G_1.$" and insert -- $\Phi_0([1^{13}]G_0) = [1^{13}]\Phi_0(G_0) = [1^{13}]G_1.$ -- therefor.

CERTIFICATE OF CORRECTION (continued)
U.S. Pat. No. 10,812,265 B1

Column 31, Line 1, Delete "C" and insert -- $\Phi_1$ -- therefor.

Column 31, Line 5, Delete "$\Phi_0$" and insert -- $\Phi_1$ -- therefor.

Column 33, Line 17, Delete "[l]$G_B$" and insert -- [l]$G_{13}$ -- therefor.

Column 33, Line 30, Delete "[l]$G_B$" and insert -- [l]$G_{13}$ -- therefor.

Column 33, Line 30, delete "[l]$G_B$." and insert -- [$l$]$G_{13}$. -- therefor.

Column 33, Line 46, Delete "202A 202B" and insert -- 202A, 202B -- therefor.

Column 35, Line 1, Delete "(P, Q R)" and insert -- (P, Q, R) -- therefor.